United States Patent
Yarvis et al.

(10) Patent No.: US 10,497,043 B2
(45) Date of Patent: Dec. 3, 2019

(54) ONLINE CLOTHING E-COMMERCE SYSTEMS AND METHODS WITH MACHINE-LEARNING BASED SIZING RECOMMENDATION

(71) Applicant: Intel Corporation, Santa Clara, CA (US)

(72) Inventors: Mark D. Yarvis, Portland, OR (US); Anantha Deepthi Uppala, Mercer Island, WA (US)

(73) Assignee: Intel Corporation, Santa Clara, CA (US)

( * ) Notice: Subject to any disclaimer, the term of this patent is extended or adjusted under 35 U.S.C. 154(b) by 819 days.

(21) Appl. No.: 14/864,560

(22) Filed: Sep. 24, 2015

(65) Prior Publication Data
US 2017/0091844 A1    Mar. 30, 2017

(51) Int. Cl.
| | | |
|---|---|---|
| G06Q 30/06 | (2012.01) | |
| G06Q 30/00 | (2012.01) | |
| G06N 20/00 | (2019.01) | |
| G06N 5/04 | (2006.01) | |
| G06N 20/10 | (2019.01) | |

(52) U.S. Cl.
CPC .......... *G06Q 30/0631* (2013.01); *G06N 5/04* (2013.01); *G06N 20/00* (2019.01); *G06N 20/10* (2019.01); *G06Q 30/016* (2013.01); *G06Q 30/0623* (2013.01)

(58) Field of Classification Search
CPC .......... G06N 5/00; G06N 5/04; G06N 99/005; G06N 20/00; G06N 20/10; G06Q 30/016; G06Q 30/06–0645; G06Q 30/08; G06Q 50/01
See application file for complete search history.

(56) References Cited

U.S. PATENT DOCUMENTS

| 2010/0076819 A1* | 3/2010 | Wannier ................. G06Q 30/02 |
| | | 705/7.33 |
| 2011/0099122 A1* | 4/2011 | Bright .................... G06Q 10/04 |
| | | 705/348 |

(Continued)

OTHER PUBLICATIONS

Lee, "Connected Consumption: The Hidden Networks of Consumption," IEEE, 2009 6th IEEE Consumer Communications and Networking Conference, Las Vegas, NV, USA, Jan. 10-13, 2009, 5pp. (Year: 2009).*

*Primary Examiner* — Adam L Levine

(74) *Attorney, Agent, or Firm* — Schwabe, Williamson & Wyatt, P.C.

(57) ABSTRACT

Methods, systems, and storage media for providing sizing information is described. In embodiments, a computing device may obtain purchase information associated with individual users. Each of the individual users may correspond to at least one user device of a plurality of user devices. The purchase information may indicate a purchase of an item by the individual users. The computing device may obtain feedback information associated with the item that is provided by a subset of the individual users. The computing device may generate sizing information for the item based on the purchase information and the feedback information. The computing device may generate a recommendation for the item. Other embodiments may be described and/or claimed.

24 Claims, 7 Drawing Sheets

(56) References Cited

U.S. PATENT DOCUMENTS

2011/0321073 A1* 12/2011 Yarvis .................. H04N 21/252
                                                    725/10
2013/0211774 A1*  8/2013 Bentley .................... A61B 5/11
                                                   702/145

* cited by examiner

| User ID | Product ID | Serial No. | Mfg Size | Country | Consumer Preferences | Customer Measurements |
|---|---|---|---|---|---|---|
| 1 | A | AAA1 | XL | USA | slim fit; thin and breathable material | height(185cm), waist-shoulder(91cm), waist (89cm), arm span(190.5cm), mass(84kg) |
| 2 | A | AAA2 | XL | USA | loose fit; thin and breathable material | height(198cm), waist-shoulder(95cm), waist (86.6cm), arm span(202.5cm), mass(90kg) |
| 3 | A | AAA3 | XL | USA | baggy fit | height(175cm), waist-shoulder(90cm), waist (83.8cm), arm span(180.5cm), mass(76kg) |
| 4 | A | AAA4 | L | USA | slim fit; heavy/thick material | height(187cm), waist-shoulder(91.63cm), waist (94cm), arm span(187cm), mass(100kg) |
| 5 | A | AAA5 | L | USA | tight fit; heavy/thick material | height(167.6cm), waist-shoulder(82.12cm), waist (72cm), arm span(172cm), mass(54kg) |
| 6 | A | AAA6 | XL | USA | loose fit; heavy/thick material | height(198cm), waist-shoulder(91cm), waist (87.2cm), arm span(200cm), mass(95kg) |
| 7 | A | AAA7 | L | USA | loose fit; heavy/thin material | height(171cm), waist-shoulder(85cm), waist (76cm), arm span(174cm), mass(70kg) |
| 8 | A | AAA8 | XL | USA | baggy fit | height(190cm), waist-shoulder(96.5cm), waist (89cm), arm span(193cm), mass(90kg) |

Fig.2

| User ID | Return ID | Product ID | Serial No. | Mfg Size | Consumer Preferences | Customer Measurements | Return Reason |
|---|---|---|---|---|---|---|---|
| 1 | R1 | A | AAA1 | XL | slim fit; thin and breathable material | height(185cm), waist-shoulder(91cm), waist (89cm), arm span(190.5cm), mass(84kg) | Defective - tear |
| 6 | R2 | A | AAA6 | XL | | height(198cm), waist-shoulder(96.5cm), waist (87.2cm), arm span(200cm), mass(95kg) | Too small/tight; too short; material too thin |
| 2 | R3 | A | AAA2 | XL | loose fit; heavy/thick material | height(198cm), waist-shoulder(95cm), waist (85.6cm), arm span(202.5cm), mass(90kg) | Too small/tight; too short |
| 4 | R4 | A | AAA4 | L | slim fit; heavy/thick material | height(187cm), waist-shoulder(91.63cm), waist (94cm), arm span(187cm), mass(100kg) | Too big/loose; material too thin |

— 135

| Product ID | Mfg Size | Consumer Preference Characteristics | height (max,min) | waist-shoulder (max,min) | waist (max, min) | arm span (max,min) | mass (max, min) |
|---|---|---|---|---|---|---|---|
| A | L | tight fit; heavy/thick material | 171, 167.6 | 85, 82.12 | 76, 72 | 174, 172 | 70, 54 |
| A | XL | loose fit / baggy fit; thin material | 190, 175 | 96.5, 90 | 89, 83.8 | 193, 180.5 | 90, 76 |

ONLINE CLOTHING E-COMMERCE SYSTEMS AND METHODS WITH MACHINE-LEARNING BASED SIZING RECOMMENDATION

FIELD

The present disclosure relates to the field of computing, and in particular, to apparatuses, methods and storage media utilizing machine-learning techniques to provide sizing recommendation for online shopping of clothing.

BACKGROUND

Online shopping is a form of electronic commerce (e-commerce) that allows consumers to directly purchase goods or services from a merchant or retailer over the internet. Merchants may provide a website or mobile application that allows consumers to purchase the merchant's products or services. One drawback associated with online shopping is that consumers are usually unable to sample the product or service prior to purchasing the product or service. For example, many online clothing retailers do not allow consumers to try on an item of clothing prior purchasing the item of clothing.

In order to address the aforementioned drawbacks, some merchants provide return policies, which may allow a consumer to purchase an item, sample the item, and return the item if the consumer is dissatisfied with the item. However, returning an item may increase costs for the consumer. The consumer may need to contact the merchant, visit a post office or shipping center, pay return shipping costs, and wait for a replacement, online store credit, or a refund. Some merchants have more generous or favorable return policies to compensate for the aforementioned drawbacks, which may provide for free return shipping. However, the generous or favorable return policies do not account for time costs associated with shipping the return item and time costs associated with receiving a refund. Furthermore, most of the generous or favorable return policies do not account for the environmental costs associated with shipping the items between the merchant and consumer.

Moreover, returning an item may increase costs for the merchant. As mentioned previously, many returns require additional shipping costs to be borne by the merchant. In addition, returns may involve manual labor for processing and restocking the returned items, which may increase overhead costs associated with inventory management and processing refunds. Furthermore, many returned items may not be resold to other consumers or may require refurbishment in order to be resold to other consumers.

Online clothing retailers often have relatively high return rates due to the difficulty that many consumers have with finding properly fitting and/or comfortable clothes. Many consumers have difficulty finding properly fitting and/or comfortable clothes due to constraints associated with standardized clothing sizes. The standardized clothing sizes take into account the combinations of body measurements of the general population in order to allow clothing manufacturers to mass produce items of clothing. However, the standardized clothing sizes are often represented by a single number, which may not account for consumers whose combination of body measurements are outside of the typical combinations of body measurements of the general population. Additionally, some body measurements were not taken into account when the standardized clothing sizes where developed by the various standards bodies. Furthermore, standardized clothing sizes developed by different standards bodies may be incompatible with each other. Moreover, the standardized clothing sizes do not account for the subjective preferences for clothing types, styles, etc., held by many consumers.

The aforementioned drawbacks of the standardized clothing sizes may be exacerbated by clothing manufacturers that deviate from the standards. As a result of various cultural pressures, most notably vanity sizing, many individual clothing manufacturers have drifted substantially away from the standardized clothing sizes, and thus, most clothing sold today has very little connection to the standardized clothing sizes. Instead, most manufactures now follow the more loosely defined standards known as catalog sizes, which may vary even among different styles of the same type of garment. Currently, some clothing manufacturers label clothing items with sizing information that is inaccurate (e.g., pants item listing waist size as "36" when it is actually a 34 inch circumference), insufficient (e.g., pants item that only includes waist and inseam sizes, but not leg diameter or circumference), or misleading (e.g., pants item listing waist size as "34" when it is really a 36 inch circumference). Furthermore, the sizing information provided by the various clothing manufacturers is often contradictory when compared to one another. These drawbacks may result in consumer frustration, which in turn, may result in increased returns for online clothing merchants.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 2 illustrates a purchase database in accordance with various example embodiments;

FIG. 3 illustrates a feedback database and a sizing database in accordance with various example embodiments;

DETAILED DESCRIPTION

Figure 1:
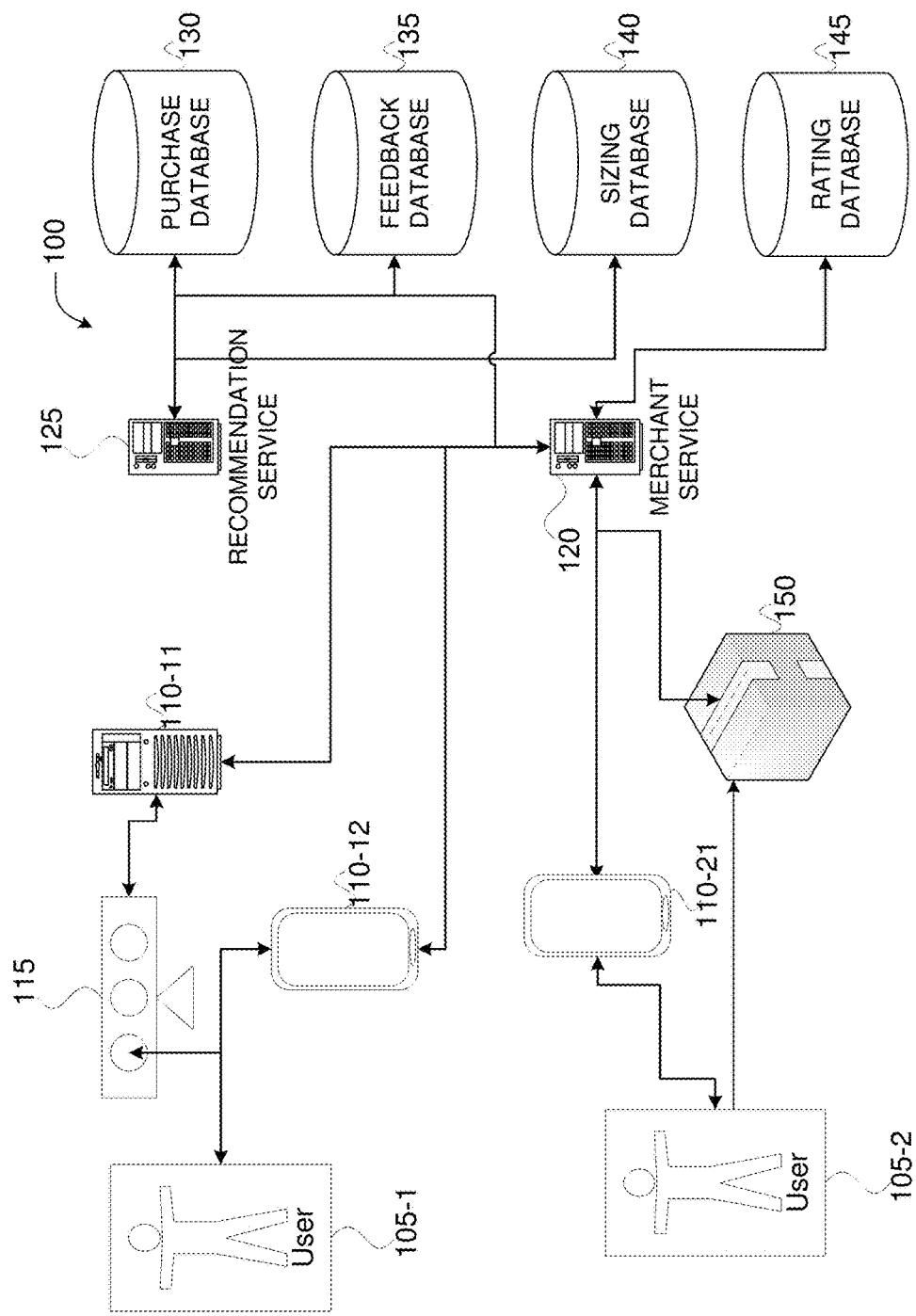
FIG. 1 illustrates an arrangement in which various example embodiments described in the present disclosure may be implemented.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural and/or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions and/or operations in turn, in a manner that is most helpful in understanding the claimed subject matter. However, the order of description should not be construed to imply that the various operations are necessarily order dependent. In particular, these operations may not be performed in the order of presentation. Operations described may be performed in a different order than the described embodiments. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). For the purposes of the present disclosure, the phrase "at least one of A and B" means (A), (B), or (A and B).

The description may use the phrases "in an embodiment", or "in embodiments", which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used herein, the term "mobile device" may be considered synonymous to, and may hereafter be occasionally referred to, as a client, mobile, mobile unit, mobile terminal, mobile station, mobile user, user equipment (UE), user terminal, subscriber, user, remote station, access agent, user agent, receiver, etc., and may describe a remote user of network resources in a communications network. Furthermore, the term "mobile device" may include any type of wireless device such as consumer electronics devices, smart phones, tablet personal computers, wearable computing devices, personal digital assistants (PDAs), laptop computers, and/or any other like physical computing device that is able to connect to a communications network.

As used herein, the term "network element", may be considered synonymous to and/or referred to as a networked computer, networking hardware, network equipment, router, switch, hub, bridge, gateway, and/or other like device. The term "network element" may describe a physical computing device of a wired or wireless communication network that is configured to host a client device and the like. Furthermore, the term "network element" may describe equipment that provides radio baseband functions for data and/or voice connectivity between a network and one or more users.

Example embodiments disclosed herein provide systems and methods for providing sizing and comfort recommendations for items of clothing. Currently, clothing manufacturers label clothing items with sizing information that is often inaccurate (e.g., pants item listing waist size as "36" when it is actually a 34 inch circumference), insufficient (e.g., pants item that only includes waist and inseam sizes, but not leg diameter or circumference), or misleading (e.g., pants item listing waist size as "34" when it is really a 36 inch circumference to make the consumer feel better about themselves, which may manipulate the consumer into making a purchase). Furthermore, the sizing information provided by the various manufacturers is often contradictory when compared to one another. In order to address these drawbacks, the example embodiments provide sizing information that reconciles the sizing information provided by various manufacturers and takes into account a user's personal clothing preferences.

Example embodiments provide recommendations that are based on sizing information that is determined using one or more machine-learning algorithms. In some embodiments, multi-dimensional cluster analysis, constraint learning, and/or sequential pattern mining (SPM) are employed. The sizing information is generated or otherwise determined using purchase information and feedback information. The purchase information may be associated with a plurality of items that are purchased from merchants by one or more customers, and may be stored in a purchase database. The term "customer" refers to persons who have previously purchased the item. The feedback information may be associated with a plurality of items that are returned to a merchant by one or more customers and may be stored in a feedback database. The feedback information may include, among other things, return information such as comments on the reason for returning an item, rating information ranking, grading, and/or evaluating an item, and the like. The feedback information may also be mined from various websites (e.g., online message boards, comments sections of online merchant websites, blogs, social media, etc.). Once determined, the sizing information may be stored in a sizing database. A recommendation for a particular item may be provided to the user based on the stored sizing information and user data. The user data may include a user's body measurements, the user's preferences, demographic information associated with the user, and the like. The user's body measurements may be obtained through an online form or by capturing images of the user. The preferences and the demographic information may be obtained through an online form or by utilizing various data mining techniques. In some embodiments, the user data may include a user's position within a physical retail outlet (also referred to as a "brick and mortar store"), and the recommendations may be provided to the user based on the user's position relative to one or more items.

Referring now to the figures. FIG. 1 shows an arrangement 100 in accordance with various embodiments. As shown in FIG. 1, arrangement 100 may include users 105 (including user 105-1 and user 105-2), computing devices 110 (including computing devices 110-11, 110-12 and 110-21), sensor 115, merchant service 120, recommendation service 125, purchase database (DB) 130, feedback DB 135, sizing DB 140, rating DB 145, and shipping service 150.

Users 105 may be persons that employ services provided by a merchant that operates the merchant service 120. The user 105 may also be referred to as a consumer, purchaser, subscriber, customer, and the like. The merchant service 120 may be a provider or operator of an e-commerce website, such as online clothing retailers. For purposes of the example embodiments described herein, the user 105-1 may represent a user that obtains item recommendations and user 105-2 may be one of a plurality of users that has purchased an item from the merchant service 120 and may return the item to the merchant service 120.

Computing devices 110 may be physical hardware computing devices capable of communicating with a one or more other hardware computing devices (e.g., sensor 115, other computing devices 110, merchant service 120, an application server and/or a web server (not shown), one or more associated databases (not shown), and the like) via a communications interface, such that computing device 110 is able to receive one or more signals and/or data streams from the other hardware computing devices. Computing device 110 may include one or more memory devices and one or more processors. Computing devices 110 may be designed to sequentially and automatically carry out a sequence of arithmetic or logical operations; equipped to record/store digital data on a machine readable medium; and transmit and receive digital data via one or more network devices. Computing device 110-11 may include substantially stationary computing devices such as desktop personal computers (PC), desktop replacement laptop PCs, video game consoles, digital media players, home servers, and/or the like. Computing devices 110-12 and 110-21 may include mobile computing devices, such as laptop PCs, smart phones, tablet personal computers, wearable computing devices, in-vehicle infotainment (IVI) and/or in-car entertainment (ICE) devices, a handheld messaging device, a personal data assistant, an electronic book reader, an augmented reality device, and the like. It should be noted that each of the computing devices 110 may be any physical or logical device capable of recording, storing, and/or transferring digital data via a connection to a network element.

In various embodiments, the computing devices 110 may include a network interface configured to connect computing device 110 to one or more other hardware computing devices wirelessly via a transmitter and a receiver (or optionally a transceiver) and/or via a wired connection using a communications port. Computing devices 110 may be configured to send/receive data to/from one or more other hardware computing devices, and/or network devices, such as a router, switch, hub, or other like network devices, via the network interface using the wired connection and/or the wireless connection. Computing devices 110 may be configured to obtain data or data streams from a network element (e.g., merchant service 120) via the network interface, and provide the data or data streams to be displayed on a display device via an input/output (I/O) interface. The computing devices 110 may include a transmitter/receiver (or alternatively, a transceiver) configured to send/receive data to/from a network element via a wireless network connection. The computing devices 110 may communicate over a communications network in accordance with one or more wireless communications protocols and/or one or more cellular phone communications protocols. For example, computing device 110-21 may be configured to operate in accordance with the Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as the Institute of Electrical and Electronics Engineers (IEEE) 802.11a, IEEE 802.11b, IEEE 802.11g, IEEE 802.11ac, and/or IEEE 802.11n, voice over Internet Protocol (VoIP), Wi-MAX, Long Term Evolution (LTE), and/or any other "wireless" communication protocols, including RF-based, optical, and so forth.

In various embodiments, computing device 110-21 may be equipped with location (or alternatively "geolocation"), positioning, and/or navigation circuitry, such as a Global Positioning System ("GPS") receiver, as well as software to convert received GPS signals into a location and/or position (within some margin of error). In various embodiments, alternate positioning systems may be employed, such as wireless network signal-strength-based indoor positioning system (IPS), hybrid systems combining global and local positioning systems, and/or other like positioning and/or location detection systems. However, in various embodiments, geolocation and/or positioning information may come from other sources including an IP address, Wi-Fi and/or Bluetooth MAC address, radio-frequency identification ("RFID"), Wi-Fi connection location, GSM/CDMA cell IDs, and the like. Furthermore, computing device 110-21 may include an accelerometer, gyroscope, magnetometer, gravimeter, and/or another like device that is configured to measure and/or detect motion, acceleration, and/or an orientation of the computing device 110-21. In such embodiments, the computing device 110-21 may be configured to determine a magnitude and direction of an acceleration and/or motion of the computing device 110-21, and convert the acceleration and/or motion of the computing device 110-21 into position and/or orientation information.

Computing devices 110 may be configured to run, execute, or otherwise operate one or more applications. In some embodiments, an application may be developed by a content provider (e.g., the merchant that operates merchant service 120) so that a user 105 may use a computing device 110 to purchase products and/or services provided by the merchant service 120. With regard to computing devices 110-12 and 110-21, the applications may include native applications, web applications, and hybrid applications. The native applications may be used for operating the computing devices 110-12 and 110-21, such as using a camera or other like sensor of the computing device 110-21, GPS functionality of the computing devices 110-12 and 110-21, an accelerometer of the computing devices 110-12 and 110-21, cellular phone functionality of the computing device 110-21, and other like functions of the computing devices 110-12 and 110-21. Native applications may be platform or operating system (OS) specific. Native applications may be developed for a specific platform using platform-specific development tools, programming languages, and the like.

Such platform-specific development tools and/or programming languages may be provided by a platform vendor. Native applications may be pre-installed on computing devices 110-12 and 110-21 during manufacturing, or provided to the computing devices 110-12 and 110-21 by an application server and/or a web server (not shown) via a network. Web applications are applications that load into a web browser of the computing device 110-21 in response to requesting the web application from a service provider. The web applications may be websites that are designed or customized to run on a mobile device by taking into account various mobile device parameters, such as resource availability, display size, touchscreen input, and the like. In this way, web applications may provide an experience that is similar to a native application within a web browser. Web applications may be any server-side application that is developed with any server-side development tools and/or programming languages, such as PHP, Node.js, ASP.NET, and/or any other like technology that renders HTML. Hybrid applications may be a hybrid between native applications and web applications. Hybrid applications may be a stand-alone, skeletons, or other like application containers that may load a website within the application container. Hybrid applications may be written using website development tools and/or programming languages, such as HTML5, CSS, JavaScript, and the like. Hybrid applications use browser engine of the computing devices 110-12 and 110-21, without using a web browser of the computing devices 110-12 and 110-21, to render a website's services locally. Hybrid applications may also access mobile device capabilities that are not accessible in web applications, such as the accelerometer, camera, local storage, and the like. Although the previous discussion pertains to computing devices 110-12 and 110-21, it should be noted that in various embodiments, the same or similar applications may be operated by computing device 110-11.

Sensor 115 may be any device that senses, detects, captures, measures or otherwise obtains a position and/or an orientation of an object and converts the sensed position and/or orientation into a signal and/or sensor data, which can be read by a computing device (e.g., computing device 110-1 and/or computing device 110-12). In various embodiments, sensor 115 may be configured to record and/or store the sensed position and/or orientation as position information (or alternatively "position data") and/or orientation information (or alternatively "orientation data"). The position information may include a location in a three-dimensional (3D) space, including a distance from sensor 115. Once the position information and/or orientation information is sensed and recorded, such position information and/or orientation information may be reported or otherwise transmitted to computing device 110-1 and/or computing device 110-12 for determining body measurements associated with user 105-1. In some embodiments, Real-Sense Technology® developed by Intel® may be employed to further enhance position/orientation determination and/or body measurement determination. Sensor 115 may also be configured to receive data requests and/or control data from computing device 110-11 and/or computing device 110-12.

In various embodiments, sensor 115 may include one or more motion capture devices that may be configured to capture motion by detecting a change in position of a body (e.g., user 105) relative to its surroundings (e.g., one or more objects surrounding the user 105), or by detecting a change in the surroundings relative to the body. In such embodiments, sensor 115 may be configured to measure the strength and/or speed of a body's motion. In various embodiments, motion may be detected by sound, opacity, reflection of transmitted electromagnetic energy (i.e., light), and/or other like means of detecting motion. In various embodiments, sensor 115 may include one or more optical cameras and/or one or more thermographic (infrared) cameras, which may be configured to form images using infrared radiation. In most embodiments, the optical cameras may include a digital image sensor, such as a charge-coupled device (CCD), a complimentary metal-oxide-semiconductor (CMOS) active pixel sensor, and/or any other suitable image capture device. The infrared camera may act as a depth sensor. Such infrared cameras may be similar to optical-lens cameras, which form images using visible light, but instead operate in wavelengths in the infrared range of the electromagnetic spectrum. In embodiments where sensor 115 includes one or more infrared cameras, sensor 115 may also include an infrared projector and/or infrared laser projector, which may be configured to project an infrared beam at one or more targets, such as one or more portions of the user 105 and/or one or more objects surrounding the user 105. The one or more infrared cameras may be configured to sense a reflection of the infrared beam being reflected off the one or more targets.

In various embodiments, sensor 115 may also include a peripheral component interface, such as a universal serial bus (USB) port, configured to connect sensor 115 to one or more other hardware computing devices (e.g., computing device 110) via a wired connection. In some embodiments, sensor 115 may also include a network interface configured to connect sensor 115 to one or more other hardware computing devices (e.g., computing device 110) wirelessly via a transmitter and a receiver (or optionally a transceiver). The wireless transmitter/receiver and/or transceiver may be configured to operate in accordance with one or more wireless communications standards in a same or similar manner as discussed with regard to computing devices 110. It should be noted that, although FIG. 1 shows sensor 115 being separate from computing devices 110-11 and 110-12, in some embodiments, sensor 115 may be embedded or otherwise included with computing device 110-11 and/or 110-12. In such embodiments, the sensor 115 may not include its own network interface.

Merchant service 120 may be one or more hardware computing devices that may include one or more systems and/or applications for providing one or more services, such as online retailing services. The merchant service 120 may include one or more servers each of which may include one or more processors, one or more memory devices and/or computer readable storage medium, and one or more network interfaces. Additionally, merchant service 120 may be a single physical hardware device, or may be physically or logically connected with other network devices, such that the merchant service 120 may reside on one or more physical hardware devices. Moreover, merchant service 120 may be connected to, or otherwise associated with one or more data storage devices or systems. The one or more data storage devices may include the purchase DB 130, the feedback DB 135, and the rating DB 145.

In order to provide the one or more services, the merchant service 120 may be capable of communicating with one or more other hardware computing devices (e.g., computing devices 110, recommendation service 125, the databases, and the like) via the network interface(s). For example, the merchant service 120 may be capable of receiving requests from one or more client devices (e.g., computing devices 110) across a communications network, and responding to such requests by providing signals and/or data streams to the one or more client devices. To provide the one or more services, the merchant service 120 may operate any suitable online storefront and/or any suitable online shopping cart system. In operating the online storefront and online shopping cart system, the merchant service 120 may be capable of generating content such as text, graphics, audio, and/or video to be transferred to computing devices 110 by way of a web server (not shown) in the form of HTML, XML, MPEG-DASH, and/or any other appropriate structured language. In various embodiments, the merchant service 120 may also provide a merchant application to enable users 105 to purchase products and/or services from the merchant service 120. Such a merchant application may be a hybrid application a web application, or another like mobile application. In various embodiments, the merchant application may enable the users 105 to provide requests and/or queries to the merchant service 120, which may be based on text entered into the merchant application, or based on a bar code or a QR code. The bar code or QR code may be obtained by way of a scanning operation using at least one sensor (e.g., a camera) of a computing device 110. In such embodiments, the merchant application may utilize a camera driver to interface with a camera of the computing device 110. The handling of all requests and responses, (e.g., requests for item information and the information provided in response) as well as the delivery of content between the computing devices 110 and the merchant service 120 may be handled by a web server (not shown). The merchant service 120 may include an operating system that may provide executable program instructions for the general administration and operation of merchant service 120, and may include a computer-readable medium storing instructions that, when executed by a processor of the application server 120, may allow the merchant service 120 to perform its intended functions. Suitable implementations for the operating system and general functionality of the servers are known or commercially available, and are readily implemented by persons having ordinary skill in the art, particularly in light of the disclosure herein. Furthermore, it should be understood that a specific device or set of devices may not be required to operate the merchant service 120 and the applications and software components used to operate the merchant service 120 may be executed on any appropriate device or host machine.

The purchase DB 130, the feedback DB 135, the sizing DB 140, and the rating DB 145 (collectively referred to as "the databases") may be hardware devices or systems for storing information pertaining to a plurality of items that have been purchased by a plurality of users. The databases may include one or more relational database management systems (RDBMS) one or more object database management systems (ODBMS), a column-oriented DBMS, correlation database DBMS, an extensible markup language (XML) format database, and the like. According to various embodiments, the databases may be stored on or otherwise associated with one or more data storage devices. These data storage devices may include at least one of a primary storage device, a secondary storage device, a tertiary storage device, a non-linear storage device, and/or other like data storage devices. In some embodiments, the databases may be associated with one or more systems or applications that enable querying of the databases and/or store information in the databases (e.g., the database query module 515 described with regard to FIG. 5). Furthermore, the databases may include one or more virtual machines, such that the physical data storage devices containing the databases may be logically divided into multiple virtual data storage devices and/or databases. Alternatively, the databases may reside on one physical hardware data storage device. It should be noted that each of the databases may include one or more suitable systems and/or suitable applications for storing all relevant information (e.g., purchase information, feedback information, sizing information, rating information, etc.) and providing the relevant information to one or more network devices in response to a DB query. Any suitable database query language may be used to store and obtain information from a DB The purchase DB 130 may store purchase information, which may indicate to indicate item purchases made by various users 105. An example embodiment of the purchase information stored in the purchase DB 130 is shown by FIG. 2.

Referring to FIG. 2, the purchase information may include a user identifier (ID), a product ID, a serial number (No.), manufacturer (mfg) sizing information, a country, consumer preferences, and customer body measurements. Although not shown by FIG. 2, the purchase information may also include any other information that is pertinent to a purchase of a product or service, such as a name of the merchant that sold the product/service; consumer demographic information; payment credential information; user location information such as the positioning information discussed previously; and/or any other like information.

The user ID may be any one or more numerals or characters that constitute a unique identifier that may refer to a specific user. For example, as shown in FIG. 2, the user IDs 1-6 may an arbitrarily assigned a number used to differentiate each user from one another. In various other embodiments, the user ID may be a media access control address (MAC address), an Internet Protocol (IP) address, a user name or other like subscriber information that is used by a user to make purchases from an online storefront operated by the merchant 120, and/or the like.

The product ID may be any one or more numerals or characters that constitute a unique identifier that may refer to an item or type of item (e.g., a product). For example, as shown in FIG. 2, the product ID of "A" may an arbitrarily assigned typographical symbol used to differentiate different items (or types of items) from one another. In various embodiments, the product ID may include a product name, product model number, brand name, and/or the like.

The serial number may be any one or more numerals or characters that constitute a unique identifier that may refer to a specific unit of the item, which may be used to distinguish specific items of a same item type from one another. For example, as shown in FIG. 2, the serial numbers of "AAA1," "AAA2," "AAA3," etc. may an arbitrarily assigned combination of typographical symbol used to differentiate each individual item from other individual items of the same item type. The serial numbers may be chosen or assigned to a unit item by any suitable serial numbering system and/or algorithm. The serial number may be printed on a label of an item, printed on the item itself, affixed to a container of the item, or included in an electronic product code (EPC) that may be obtained by scanning a bar code, quick response (QR) code, or obtaining an RFID signal from an embedded active RFID tag.

The mfg size may be sizing information provided by a manufacturer of an item. In some cases, the mfg sizing information may be based on a standardized clothing size, or a deviation from a standardized clothing size. The mfg sizing information may be printed on a label of an item, printed on the item itself, affixed to a container of the item, or included in an EPC that may be obtained by scanning a bar code, QR code, or obtaining an RFID signal from an embedded active RFID tag. As shown by FIG. 2, the mfg size for AAA1, AAA2, AAA3, AAA6, and AAA8 is extra-large ("XL"), and the mfg size for AAA4, AAA5, AAA7 is large ("L"). The country may refer to the country, nation, or region that associated with the standardized clothing size. For example, as shown by FIG. 2, the country is "USA," and assuming that item A is a men's shirt, the mfg size of XL may be based on the International Standards Organization (ISO) 3636 standard or another United States based clothing standard. By way of another example, if an item has a country designation of "European Union (EU)," the mfg size may be based on one or more European Committee for Standardization (CEN) standards.

The consumer preferences may indicate an individual user's preference(s) and/or inclination(s) toward a category or type of item. For example, the consumer preferences may indicate each individual user's desired size, shape, material type, etc., for a category of garments. For example, as shown by FIG. 2, the consumer preferences may indicate "slim fit," "baggy fit," "breathable material," "thick material," etc. The examples of consumer preferences shown by FIG. 2 are meant to be illustrative, and the example embodiments should not be interpreted as being limited to the consumer preferences shown by FIG. 2. For example, many more descriptive terms for consumer preferences may be used. Additionally, in various embodiments numbers or digits may be used to indicate consumer preferences. In such embodiments, a ranges or threshold values may be used to indicate various consumer preferences.

The consumer measurements may be body measurements for individual users that purchase an item. Body measurements used to develop the standardized clothing sizes include horizontal torso measurements, such as neck circumference, shoulder width, over-bust circumference, full bust circumference, bust-point separation, under-bust (rib-cage) circumference, waist circumference, upper hip circumference, and lower hip circumference; vertical torso measurements, such as the neck-waist length, shoulder-waist length, the bust-shoulder length, the bust-waist length, and two hip-waist lengths; and sleeve measurements, such as under-arm and over-arm lengths, fore-arm length, wrist circumference and biceps circumference. According to various embodiments, the consumer measurements may include the aforementioned body measurements and/or body measurements not used to develop the standardized clothing sizes. For example, as shown by FIG. 2, the consumer measurements may include waist-shoulder length and waist circumference, which typically have been used to develop the standardized clothing sizes; height, which has been taken into consideration by some standard organizations; and arm span and mass, which were not typically taken into account to develop standardized clothing sizes. It should also be noted that some of the body measurements used to develop the standardized clothing sizes for one garment may not have been used to develop the standardized clothing sizes for another garment. For example, the waist circumference body measurement may not have been considered for developing the standardized clothing sizes "L" and/or "XL." Furthermore, the consumer measurements may be provided to the merchant service 120 from the individual users by way of an online form of the online storefront, determined from one or more captured images, or by any other suitable methods for obtaining body measurements. In some embodiments, when an image is captured by the sensor 115 and/or a computing device 110, Real-Sense Technology® developed by Intel® may be employed to further enhance the body measurement determination.

Referring back to FIG. 1, the feedback DB 135 may store feedback information associated with a purchased item, which in at least some cases, has been subsequently returned or commented upon after purchase. The feedback information may include return information indicating a reason why an item has been returned to the merchant service 120. An example embodiment of the feedback information stored in the feedback DB 135 is shown by FIG. 3. In some embodiments, the feedback information may include rating information indicating a rank, grade, or other like evaluation of an item, and/or other like information (not shown by FIG. 3).

Referring to FIG. 3, the feedback information may include the user ID, product ID, serial number, mfg sizing information, consumer preferences, customer body measurements, and return reasons. The user ID, product ID, serial number, mfg sizing information, consumer preferences, and customer body measurements may be the same as discussed previously with regard to FIG. 2. The return reasons may indicate a reason why an item has been returned to the merchant service 120. Such reasons may be based on product quality or defect, or the reasons may be due to sizing considerations (also referred to as a "size related return"). For example, as shown by FIG. 3, the user 1 has returned item A due to a tear in the fabric of item A, while user 6 returned item A because it was too small or tight, too short, and the material was too thin. The examples of return reasons shown by FIG. 3 are meant to be illustrative, and the example embodiments should not be interpreted as being limited to the return reasons shown by FIG. 3. For example, many more descriptive terms for return reasons may be used. Additionally, in various embodiments numbers or digits may be used to indicate return reasons. In such embodiments, a ranges or threshold values may be used to indicate various return reasons. Although not shown by FIG. 3, the feedback information may also include any other information that is pertinent to a product or service, such as rating information, a name of the merchant that sold the product/service; a time period between purchasing an item and returning the item; consumer demographic information; payment credential information; user location information such as the positioning information discussed previously; and/or any other like information. The return reasons or other feedback information may be obtained via an online form provided by the merchant service 120. For example, referring to FIG. 1, the merchant service 120 may require the user 105-2 to fill out an online form using computing device 110-21 in order for the user 105-2 to obtain a return shipping label for returning an item via the shipping service 150. Once obtained, the merchant service 120 may store the feedback information in the feedback DB 135, which may then be used by the recommendations service 125 for a sizing information determination.

Referring back to FIG. 1, the sizing DB 140 may store sizing information, which may be generated based on the purchase information and the feedback information. An example embodiment of the sizing information stored in the sizing DB 140 is shown by FIG. 3. While the example sizing DB 140 in FIG. 3 depicts a model in which a given size of a given product is a good fit if each measurement fits a given range, the database schema of the sizing DB 140 may be generalized to support a machine learning approach. The sizing DB 140 may, for example, contain parameters for a support vector machine (SVM) that can classify a user as either a "good fit" or a "poor fit" for a given garment at a given size.

Referring to FIG. 3, the sizing information may include the product ID, mfg sizing information, consumer preferences, and various body measurements. The product ID and the mfg sizing information may be the same as discussed previously with regard to FIG. 2. According to various example embodiments, the consumer preferences and the various body measurements may be determined by the recommendation service 125 based on the preference information and the feedback information. The consumer preferences within the sizing information may also be referred to as "sizing characteristics," "characteristics," and the like. The recommendation service 125 may apply one or more machine-learning techniques to the preference information and the feedback information to determine the characteristics and the various body measurements from the purchase information and the feedback information. More specifically, in embodiments, the recommendation service 125 may perform a multi-dimensional cluster analysis, perhaps employing an SVM, on the preference information and the feedback information to determine the characteristics and the various body measurements from the purchase information and the feedback information. Cluster analysis or clustering is the technique of grouping a set of objects (within the preference information and the feedback information) in such a way that objects in the same group (called a cluster) are more similar (in some sense or another) to each other than to those in other groups (clusters). Multi-dimensional cluster analysis may include clustering objects according to a few dozen to thousands of dimensions. An SVM may be a supervised learning model with associated learning algorithms that analyzes data and recognizes one or more patterns used for classification and regression analysis. The SVM may be provided with a set of training examples or training data, each marked for belonging to one of two categories (e.g., a "good fit" category or a "poor fit" category). The set of training data may allow an SVM training algorithm to be constructed, wherein the SVM training algorithm may build an SVM model that assigns new examples into one of the two categories, making the SVM model a non-probabilistic binary linear classifier. An SVM model may be a representation of the examples as points in space, mapped so that the examples of the separate categories are divided by a clear gap that is as wide as possible. New examples may then be mapped into that same space and predicted to belong to a category based on which side of the gap they fall on.

In some embodiments, all entries in the purchase DB 130 and the feedback DB 135, which are related to the same mfg size of the same product ID can be run through an SVM, including consumer measurements and consumer preferences. This data would make up the "training data" for the classifier and would be labeled as "a poor fit" if the item was returned due to a sizing issue (as determined by return reasons in the feedback information of the feedback DB 135) and "a good fit" otherwise. The SVM may then identify a model for that product ID and mfg size which can determine whether a given customer (e.g., user 105-1), and their associated body measurements and preferences, would represent a "good fit" or "poor fit." A different SVM model could be created for each product ID and size and/or for each product ID and each preference (also referred to as a "characteristic") derived from the preference information. The parameters of each model could then be stored in sizing DB 140. In alternate embodiments, other machine learning techniques may be used in addition to or in lieu of one or more of the above numerated techniques. In various embodiments, the preference information provided by users that did not also provide feedback information may be used to determine the characteristics and the various body measurements. In some embodiments, only users that provide non-size related feedback information are excluded from the determination of the sizing information. For example, referring to FIGS. 2 and 3, users 2, 4, and 6 provided feedback information including size-related return reasons. Therefore, the preference information for users 3, 5 and 7-8 may be included the determination of the sizing information and the preference information for users 2, 4, and 6 may be excluded from the determination of the sizing information. Additionally, in various embodiments, the various body measurements may be based on minimum body measurement values and maximum body measurement values. For example, referring to FIGS. 2 and 3, for each mfg size of item A, the height measurement, waist-shoulder measurement, waist circumference measurement, arm span measurement, and the mass measurement may each be a minimum value and maximum value of the body measurements obtained from users 3, 5, and 7-8. Furthermore, for each mfg size of item A, the consumer preference characteristics may be the preference information of users 3, 5, and 7-8.

Referring back to FIG. 1, the rating DB 145 may store rating information, which may indicate a ranking, scoring, grading, and/or any other like evaluation of an item provided by a plurality of users. Such rating information may be obtained from a communication platform that is associated with the merchant service 120 or a third party communication platform. The communication platform associated with the merchant service 120 may include a comments section, a review section, message board, etc., that may be included in a webpage associated with the item. Such a communication platform may include customer reviews or other like feedback associated with the item, and such customer reviews may be graded for usefulness or accuracy by other users. The third party communication platforms may include dedicated review websites that may include customer reviews and/or professional reviews of an item, microblogging websites, social media websites, etc. The rating information may be mined or otherwise obtained from the third party communication platforms according to known web crawling techniques. In some embodiments, the rating information may be provided to the feedback DB 135 to help further refine the sizing information determination discussed herein. It should be noted that the rating information may include positive, neutral, and/or negative feedback. In various embodiments, the rating information may be grouped or clustered based on whether it indicates a positive characteristic, a neutral characteristic, or a negative characteristic. These characteristics may then be used to supplement or further refine the feedback information that is used to generate the sizing information. For example, user's may expresses a preferences by rating one or more items, for example by clicking on graphical control elements or providing text-based feedback to a communication's platform. The merchant service 120 may obtain these ratings, match or otherwise correlate these ratings with ratings given by users included in the purchase DB 130, and determine users included in the purchase DB 130 that have a same or similar taste in various items based on whether the users included in the purchase DB 130 have rated the same or similar items positively (or have not rated negatively). The merchant service 120 may query the recommendation service 125 with a list of positively rated items that would be a "good fit" for a current user (e.g., user 105-1) based on user data associated with the current user. Furthermore, in various embodiments, the preferences and/or ratings may be weighted according to various criteria, such as demographic information of a user, a frequency or number of items a user has rated, whether a user returned the item and/or a time period between the purchase of the item and the return, and the like.

Referring back to FIG. 1, recommendation service 125 may be one or more hardware computing devices that may include one or more systems and/or applications for providing one or more services, such as online retailing services. The recommendation service 125 may include the same or similar hardware computing devices that may operate in a same or similar fashion as discussed previously with regard to merchant service 120. In various embodiments, the recommendation service 125 may determine sizing information based on purchase information and feedback information, and provide sizing recommendation based on the sizing information according to the various example embodiments disclosed herein. In the case that each row of the sizing DB 140 contains parameters for an SVM, the body measurements and preference information associated with the user 105-1 may be classified by each SVM to determine which rows of the sizing DB 140 represent a "good fit" and which represent a "poor fit" for the user 105-1.

It should be noted that the various devices shown by FIG. 1 may communicate with one another over a communications network. Such a network may be any network that allows computers to exchange data and may include one or more network elements (not shown) capable of physically or logically connecting computers. Such a network may be any appropriate network, including an intranet, the Internet, a cellular network, a local area network (LAN), a personal network or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof.

Figure 4:
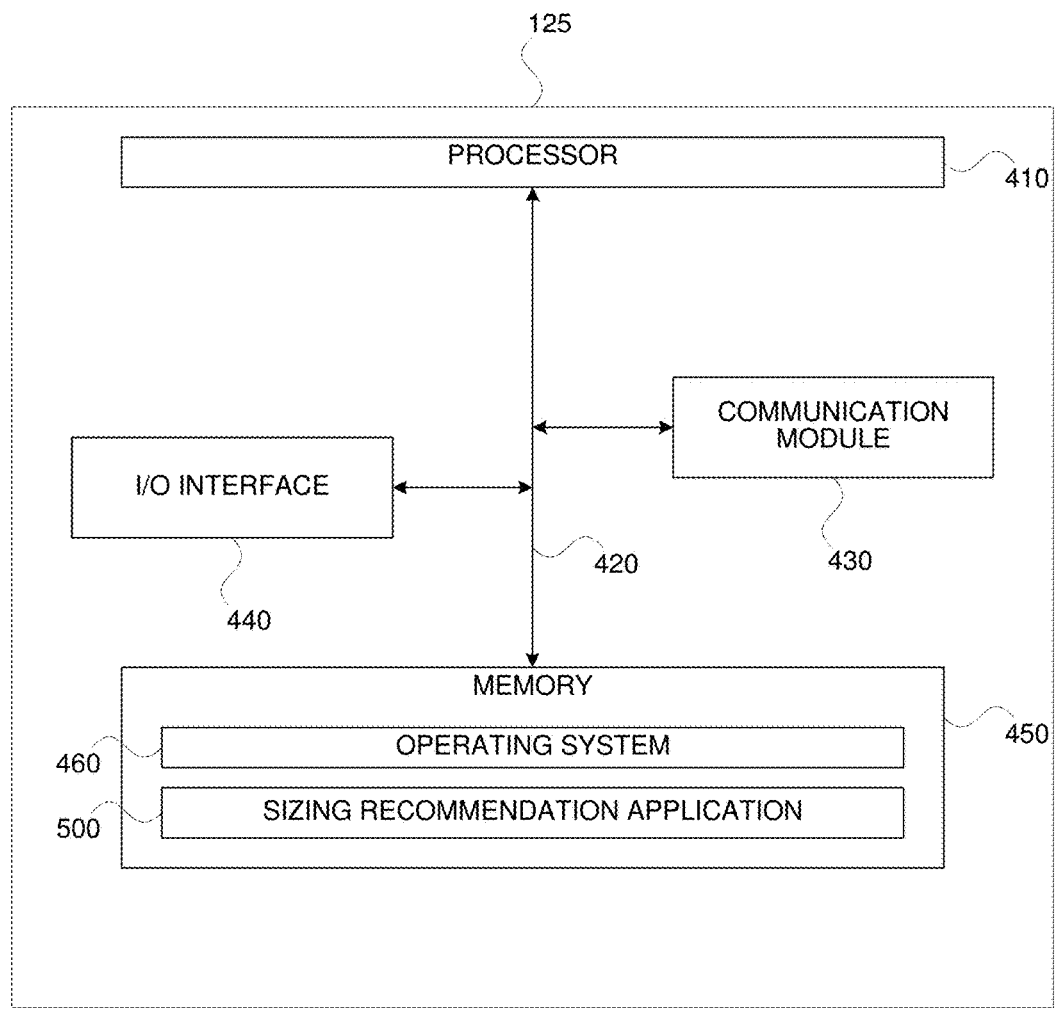
FIG. 4 illustrates the components of a computing device implemented in a recommendation service, in accordance with various example embodiments.

As shown in FIG. 1, only two users 105, three computing devices 110, one sensor 115, two servers, and four databases are present. According to various embodiments, any number of users, any number of computing devices, any number of servers, and/or any number of databases may be present. Additionally, in some embodiments, merchant service 120, the recommendation service 125, and/or one or more databases may be virtual machines, and/or they may be provided as part of a single cloud computing service such that the recommendation service 125 and the databases are integrated with the merchant service 120. In various embodiments, servers and one or more databases may reside on one physical hardware device, and/or may be otherwise fully integrated with one another. In other embodiments, the recommendation service 125 may be provided as a standalone service that may provide the recommendation services to a plurality of merchant services 120. In such embodiments, the merchant services 120 and the recommendation service 125 may each have their own purchase databases, feedback databases, and/or rating databases. Thus, the depiction of the illustrative communications network 100 in FIG. 1 should be taken as being illustrative in nature, and not limited to the scope of the disclosure FIG. 4 illustrates the components of the computing device that may be implemented in the recommendation service 125 in accordance with various example embodiments. As shown, such a computing device may include processor 410, bus 420, communication module 430, input/output (I/O) interface 440, and memory 450. In some embodiments, computing devices 110 may include many more components than those shown in FIG. 2, such as a display device (e.g., a touchscreen), an input device (e.g., a physical keyboard), one or more image sensors, a transmitter/receiver (or alternatively, a transceiver), a mobile video card and/or or graphics processing unit (GPU), and other like components. However, it is not necessary that all of these generally conventional components be shown in order to disclose the example embodiments.

Memory 450 may be a hardware device configured to store an operating system 460 and program code for one or more software components, such as operation adjustment routine 300 and/or one or more mobile applications. Memory 450 may be a computer readable storage medium that generally includes a random access memory (RAM), read only memory (ROM), a flash memory device, a solid state disk (SSD), a secure digital (SD) card, and/or other like storage media capable of storing and recording data. The program code and/or software components may also be loaded from a separate computer readable storage medium into memory 450 using a drive mechanism (not shown). Such separate computer readable storage medium may include a memory card, memory stick, removable flash drive, sim card, and/or other like computer readable storage medium (not shown). In some embodiments, software components may be loaded into memory 450 via communication module 430, rather than via a computer readable storage medium.

During operation, memory 450 may include operating system 460, Sizing recommendation application 500, and/or one or more other applications (not shown). Operating system 460 may manage computer hardware and software resources and provide common services for computer programs. Operating system 460 may include one or more drivers, such as a display driver, camera driver, audio drivers, and/or any other like drivers that provide an interface to hardware devices thereby enabling operating system 460 and sizing recommendation application 500 to access hardware functions without needing to know the details of the hardware itself. The operating system 460 may be a general purpose operating system or an operating system specifically written for and tailored to one or more computing devices of the recommendation service 125. Sizing recommendation application 500 may be a collection of software modules and/or program code that enables the one or more computing devices of the recommendation service 125 to operate according to the various example embodiments as discussed with regard to FIGS. 6-8 to apply one or more machine-learning techniques, such as multi-dimensional cluster analysis, constraint learning analysis, SPM, and so forth on preference and feedback information to generate the recommendations.

Processor 410 may be configured to carry out instructions of a computer program by performing the basic arithmetical, logical, and input/output operations of the system. The processor 410 may include a single-core processor, a dual-core processor, a triple-core processor, a quad-core processor, etc. The processor 410 may perform a variety of functions for the computing devices 110 and may process data by executing program code, one or more software modules, firmware, middleware, microcode, hardware description languages, and/or any other like set of instructions stored in the memory 450. The program code may be provided to processor 410 by memory 450 via bus 420, one or more drive mechanisms (not shown), and/or via communication module 430. In order to perform the variety of functions and data processing operations, the program code and/or software components may be executed by the processor 410. On execution by the processor 410, the processor 410 may cause the computing device implemented in the recommendation service 125 to perform the various operations and functions delineated by the program code.

For example, in various embodiments, the computing device implemented in the recommendation service 125 may include various modules configured to operate (through hardware and/or software) according to the various example embodiments described herein. The sizing recommendation application 500 may include various modules that may be loaded into the processor 410. The various modules may include sizing information module 505, recommendation module 510, and data access module 515 (as discussed with regard to FIG. 5). Once the various modules of the sizing recommendation application 500 are loaded into memory 450 and executed by the processor 410, the processor 410 may be configured to cause computing device implemented in the recommendation service 125 to obtain purchase information associated with individual users each of which corresponds to at least one user device of a plurality of user devices, wherein the purchase information is to indicate a purchase of an item by the individual users; obtain feedback information associated with the item wherein the feedback information is to be provided by a subset of the individual users; generate sizing information for the item based on the purchase information and the feedback information; generate a recommendation message for a first user device based on the sizing information and first user data, wherein the first user device is not among the plurality of user devices; and provide the recommendation message to the first user device. While specific modules are described herein, it should be recognized that, in various embodiments, various modules may be combined, separated into separate modules, and/or omitted. Additionally, in various embodiments, one or more modules may be implemented on separate devices, in separate locations, or distributed, individually or in sets, across multiple processors, devices, locations, and/or in cloud-computing implementations.

Bus 420 may be configured to enable the communication and data transfer between the components of the computing device implemented in the recommendation service 125. Bus 420 may comprise a high-speed serial bus, parallel bus, internal universal serial bus (USB), Front-Side-Bus (FSB), and/or other suitable communication technology for transferring data between components within computing devices 110 and/or between computing devices 110 and other like devices. In various embodiments, the bus 420 may be an I/O bus that may comprise a PCI bus, a PCI-Express (PCI-e) bus, a Small Computer System Interface (SCSI) bus, and the like.

Communication module 430 may be a computer hardware component that connects computing device 105 to a computer network. Communication module 430 may connect computing device 105 to a computer network via a wired or wireless connection. Communication module 430 may be communication circuitry operating in conjunction with a network interface (not shown) and/or a wireless transmitter/receiver (or transceiver) (not shown) that is configured to operate in accordance with one or more wireless standards or wired communications ports. The wireless transmitter/receiver and/or transceiver may be configured to operate in accordance with a wireless communications standard, such as the IEEE 802.11-2007 standard (802.11), the Bluetooth standard, and/or any other like wireless standards. The wired communications ports may be configured to operate in accordance with a wired communications protocol, such as a serial communications protocol (e.g., the USB, FireWire, SDI, and/or other like serial communications protocols), a parallel communications protocol (e.g., IEEE 1284, CAMAC, and/or other like parallel communications protocols), and/or a network communications protocol (e.g., Ethernet, token ring, fiber distributed data interface (FDDI), and/or other like network communications protocols). The communication module 430 may also include one or more virtual network interfaces configured to operate with sizing recommendation application 500 and/or other like applications.

In embodiments where the computing device implemented in the recommendation service 125 includes a transmitter/receiver and/or transceiver, the transmitter may be any type of hardware device that generates or otherwise produces radio waves in order to communicate with one or more other devices. The transmitter may be coupled with an antenna (not shown) in order to transmit data to one or more other devices. The transmitter may be configured to receive digital data from one or more components of the computing device implemented in the recommendation service 125 via bus 420, and convert the received digital data into an analog signal for transmission over an air interface. The receiver may be any type of hardware device that can receive and convert a signal from a modulated radio wave into usable information, such as digital data. The receiver may be coupled with the antenna (not shown) in order to capture radio waves. The receiver may be configured to send digital data converted from a captured radio wave to one or more other components of the computing device implemented in the recommendation service 125 via bus 420. In embodiments where the computing device implemented in the recommendation service 125 includes a transceiver (not shown) instead of a transmitter and receiver, the transceiver may be a single component configured to provide the functionality of a transmitter and receiver as discussed above.

Figure 5:
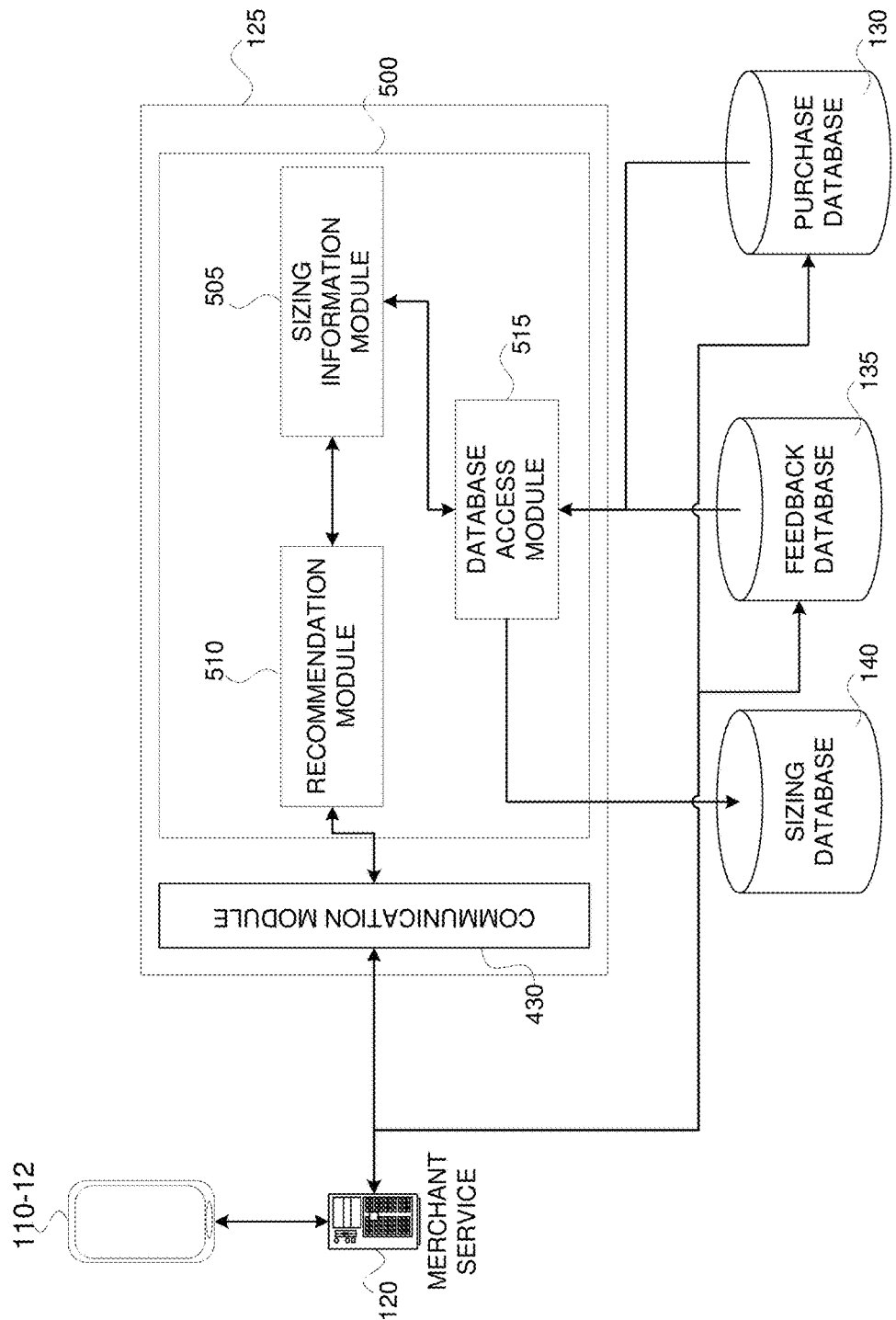
FIG. 5 illustrates example logical components and interaction points of a sizing recommendation application in accordance with various embodiments.

FIG. 5 illustrates example logical components and interaction points of the recommendation service 125 and the sizing recommendation application 500, in accordance with various embodiments. The sizing recommendation application 500 may, in various embodiments, be configured to perform various techniques described herein, including determining sizing information from purchase information and feedback information. As shown in FIG. 5, sizing recommendation application 500 may include sizing information module 505, recommendation module 510, and database access module 515.

According to various embodiments, the sizing information module 505 may obtain, via the database access module 515, purchase information from the purchase DB 130 and obtain feedback information from the feedback DB 135. The sizing information module 505 may then generate sizing information to be stored in the sizing DB 140. The sizing information module 505 may determine a model that classifies individual users associated with the purchase information and excluding at least some of the individual users that provided the feedback information. The sizing information module 505 may determine preference information individual users associated with the purchase information and excluding at least some of the individual users that provided the feedback information. In some embodiments, the sizing information module 505 may determine multiple minimum body measurement values and multiple maximum body measurement values, such as determining a first minimum body measurement value and a first maximum body measurement value for a first set of users and a second minimum body measurement value and a second maximum body measurement value for a second set of users. The users may be grouped or clustered into sets of users according to preference information and/or demographic information. For example, the sizing information module 505 may determine, for a particular item and size that for someone who likes a baggy fit, someone who fits within a first minimum and maximum chest size and minimum and maximum waist size will find the item acceptable, while for someone who prefers a tight fit, a person with a second minimum and maximum chest size and minimum and maximum waist size will find the item acceptable. In another example, the sizing information module 505 may find that a person from a particular geographic region may find a particular item and size to be acceptable if they have a third minimum and maximum chest size and minimum and maximum waist size. Any suitable machine-learning algorithm(s) may be used to group/cluster users according to demographics and/ or preferences. In one embodiment, an SVM may be used, in which a user's body measurements and preferences form dimensions for multi-dimensional clustering. In such embodiments, two clusters may be created, such as a "good fit" cluster and a "poor fit" cluster. The SVM may create an SVM model, which may be used by the sizing information module 505 to create maximally distant clusters. Regardless of what mechanism is used to perform clustering, the sizing information module 505 may store the resulting classification model in the sizing DB 140.

According to various embodiments, the recommendation module 510 may obtain the sizing information from the sizing DB 140, perform the machine-learning analysis to determine which cluster (e.g., the "good fit" or the "poor fit") a user fits into for a given item and size, and generate a recommendation message based the cluster to which the user should be classified. The recommendation module 510 may provide the recommendation message to the computing device 110-12 via the merchant service 120. The recommendation module 510 may communicate the recommendation message to the merchant service 120 via the communication module 430. The recommendation message may be provided to the computing device 110-12 in response to a query or other like request message from the computing device 110-12, which may be provided to the recommendation service 125 via the merchant service 120. Such a request message may be based on a product search performed by the computing device 110-12 using the online storefront provided by the merchant service 120, and/or the computing device 110-12 may actively request an item recommendation using various graphical control elements provided by the online storefront. In some embodiments, the request message may be generated in response to a scan of a bar code or QR code by the computing device 110-12. The merchant service 120 may then pass the request message to the recommendation service 125 with the product ID and user data including body measurements associated with a user of the computing device 110-12 (e.g., user 105-1), demographic information associated with the user 105-1, and preference information of the user 105-1.

In response to receipt of the request message, the recommendation module 510 may generate the recommendation message by determining body measurements associated with the user 105-1 and preference information associated with user 105-1 from the request message. The recommendation module 510 may determine user characteristics or preferences associated with the user 105-1 based on the preference information and/or the demographic information. The recommendation module 510 may determine whether the body measurements of the user 105-1 fit the clustering model for the product ID and product size contained in the request message. The recommendation module 510 may generate the recommendation message to recommend the item for purchase when the characteristic associated with the user 105-1 is determined to be substantially similar to the model representing a "good fit" for the product ID. Otherwise, the recommendation module 510 may generate the recommendation message to not recommend the item and size for purchase. It should be noted that in some embodiments, the recommendation message to not recommend the item for purchase may include a recommendation message to purchase one or more other items and/or sizes that represent a "good fit" for the characteristics associated with the user 105-1. For example, referring to FIGS. 2-3, if the user 105-1 submits a search request for product A having a size XL, the recommendation module 510 may generate a recommendation message to recommend purchase of product A if the body measurements of the user 105-1 are within the body measurement ranges shown by the sizing information of FIG. 3. However, if a height of the user 105-1 is under 175 centimeters (cm) or over 190 cm, and/or the characteristics associated with the user 105-1 include "slim fit" and/or "thick material," for example, then the recommendation module 510 may generate a recommendation message to recommend purchase of product A that has a mfg size of "L."

Furthermore, in various embodiments, the recommendation message may include a list of items or alternative items recommended for purchase. In one embodiment, the merchant service 120 may submit multiple queries to the recommendation service 125. Each query may be submitted for each possible product and size that the merchant service 120 may determine to be a potential alternative product. In another embodiment, the recommendation module 510 may run an SVM against the SVM model on a subset of the entries in the sizing DB 140 and to return all entries for which the SVM model indicates that the user is "a good fit." In such embodiments, the user's characteristics may be matched against a subset of items in the sizing DB 140 and the list of items that are indicative of a "good fit" may be returned. The subset of entries to check in the sizing DB 140 may include other items in the same size and/or other items that are similar in other ways, such as items having a same or similar manufacturer, a same or similar color, a same or similar fabric, associated with similar preferences as the user's preferences, and the like. In this regard, the online storefront may provide the computing devices 110-12 with one or more graphical control elements that enable the user 105-1 to select one or more preferences or preference types. In some embodiments, the merchant service 120 may use or discover the user data from one or more applications running on the computing device 110-12, such as a merchant application associated with a merchant service 120, an application associated with a third party communication platform, a web browser, and the like. In such embodiments, the user data may be based on the purchasing history, search history, browser history, system data, and/or other sources of data pertaining to the user 105-1. In some embodiments, the recommendation module 510 may arrange the list of items according to the preferences associated with the user 105-1, such as in ascending or descending order based on how close the items of the list match the user's preferences.

The list may also be populated and/or filtered according to contextual information associated with the computing device 110-12. The contextual information of the computing devices 110 may include a position of the computing devices 110-12 within a brick-and-mortar store, a date and time that the request message is sent by the computing device 110-12, and/or any other like contextual information associated with the computing device 110-12. For example, the user data may include position information associated with the computing device 110-12, and the merchant service 120 may be capable of determining one or more items for sale in a brick-and-mortar store that are proximate to the computing device 110-12. The merchant service 120 may determine whether the one or more items for sale in a brick-and-mortar store are proximate to the computing device 110-12 if a distance between the computing device 110-12 and the one or more items is within a predefined distance or a predefined number of the one or more items having a closest distance to the computing device 110-12. In various embodiments, the merchant service 120 may query the recommendation module 510, with the body measurement information and/or preference information associated with the user 105-1, to determine which of the proximate one or more items, in one or more possible sizes, are considered a "good fit." In such embodiments, the brick-and-mortar store may include various network devices, such as Wi-Fi routers, Bluetooth beacons, and the like, and the computing device 110-12 may obtain or determine its position according to known indoor positioning systems and/or methods. In some embodiments, the computing device 110-12 may provide its GPS coordinates or other like geolocation information to the merchant service 120. Once the list of services is displayed to the user 105-1 on the computing device 110-12, the user may select one or more of the listed items in order to purchase a selected item through the online storefront provided by the merchant service 120.

According to various embodiments, the database access module 515 may be any suitable system or application for entering/storing and retrieving information from one or more DBs. For example, database access module 515 may be used by the sizing recommendation application 500 to obtain purchase information from the purchase DB 130; obtain feedback information from the feedback DB 135; and provide sizing information to the sizing DB 140. The database access module 515 may query the DBs using any suitable database query language to request information from the DBs. In response to the query, the database access module 515 may receive the requested information from the databases. According to various embodiments, the information may be in the form of a file, record, or other like resource for storing information that provides a description of one or more properties of the purchase information, feedback information, sizing information, etc. In various embodiments, the information may be in the form of a markup language file, such as XML, Hypertext Markup Language (HTML), Extensible HTML (XHTML), and the like. Once the information is received from the databases, the database access module 515 may provide the information to the sizing information module 505 or the recommendation module 510.

As shown in FIG. 5, the sizing recommendation application 500 comprises each of the sizing information module 505, the recommendation module 510, and the database access module 515. However, according to various embodiments, additional modules may be present and/or the aforementioned modules may be combined of divided into other logical components. Additionally, in various embodiments, one or more of the modules shown in FIG. 5 may be provided as part of a cloud computing service such that one or more physical hardware devices may provide the same or similar functionality as the one or more of the modules shown in FIG. 5. For example, the sizing information module 505 could be implemented by a first server and the recommendation module 510 may be implemented by a second server.

Figure 6:
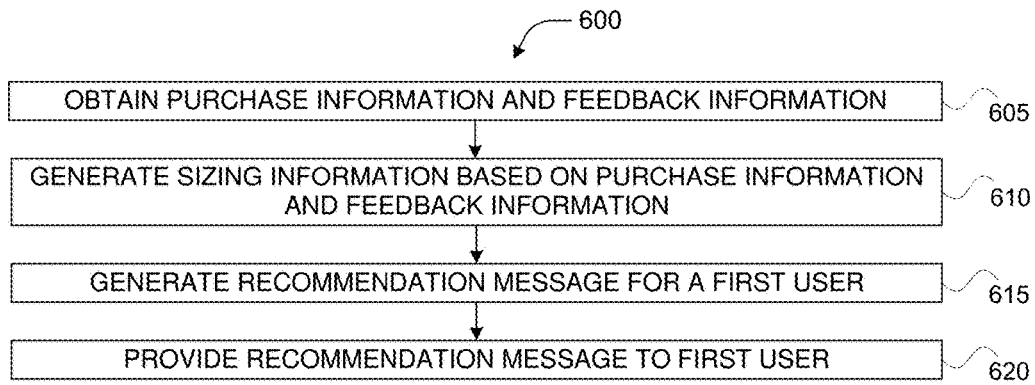
FIGS. 6-8 illustrate an example process 600 of a sizing recommendation application in accordance with various embodiments.
Figure 7:
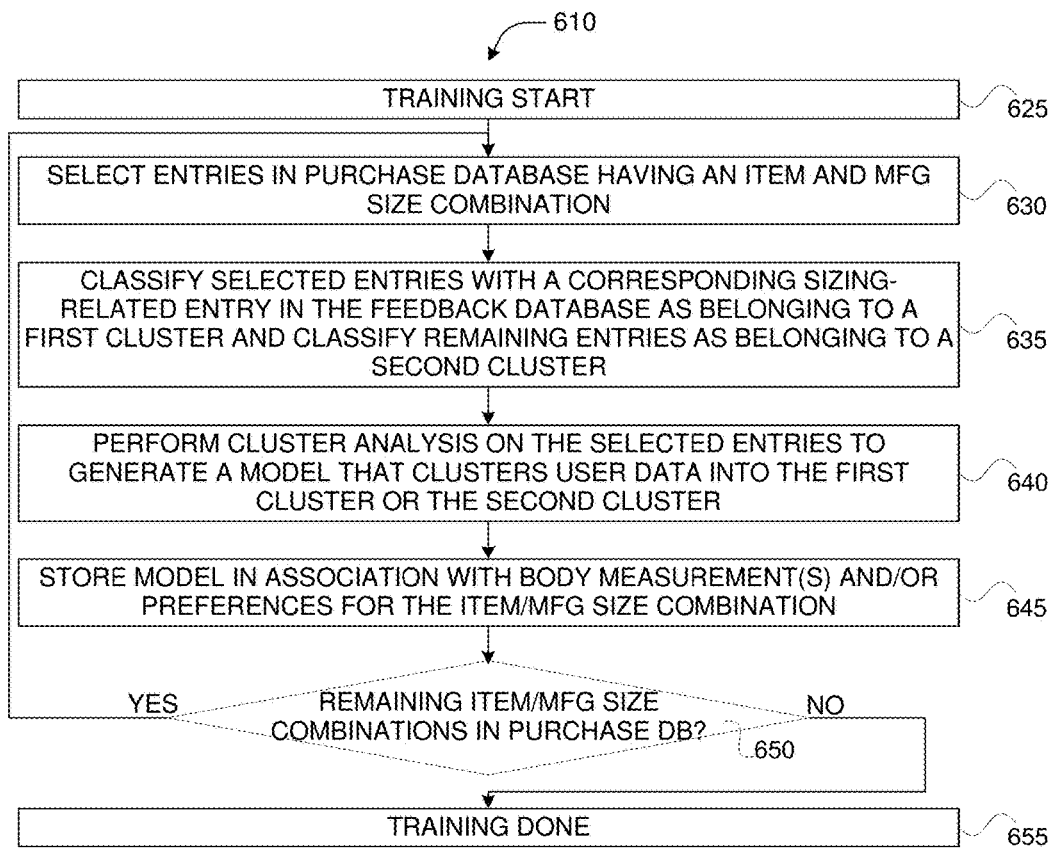
Figure 8:
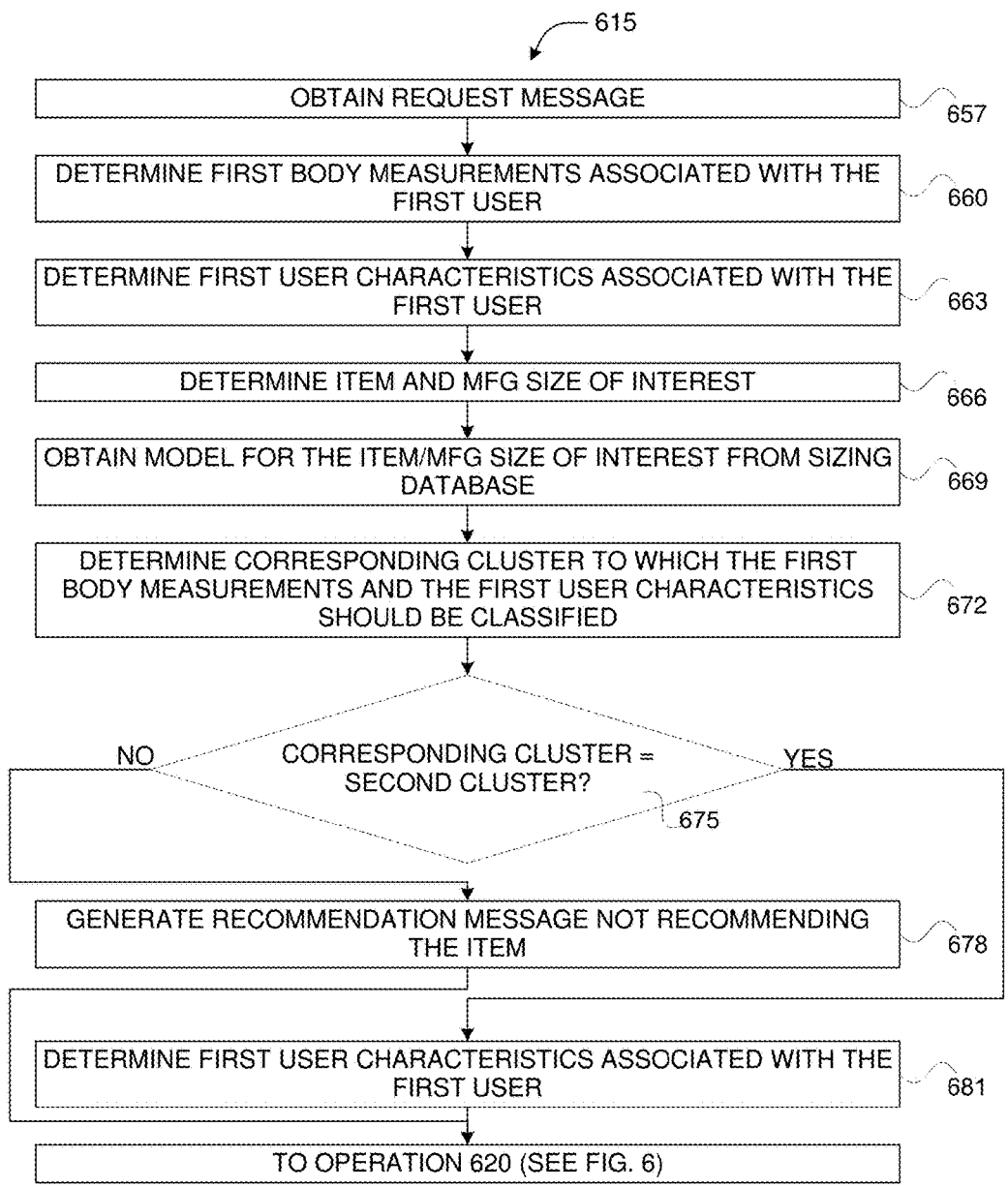

FIGS. 6-8 show a flowchart illustrating an example process 600 of the sizing recommendation application 500, in accordance with various embodiments. For illustrative purposes, the operations of process 600 will be described as being performed by a computing device that may be implemented in the recommendation service 125, which is described with respect to FIGS. 1 and 5. However, it should be noted that other similar devices may operate the process 600 as described below. While particular examples and orders of operations are illustrated in FIGS. 6-8, in various embodiments, these operations may be re-ordered, broken into additional operations, combined, and/or omitted altogether.

Referring to FIG. 6, at operation 605, the computing device may obtain purchase information and feedback information, such as from a purchase DB 130 and feedback DB 135. Examples of such purchase information and feedback information is shown by FIGS. 2 and 3. At operation 610, the computing device may perform machine learning analysis on the purchase and feedback information to generate sizing information based on the purchase information and the feedback information. Operation 610 is described in more detail with regard to FIG. 7.

Referring now to FIG. 7, at operation 625, the computing device may start model training In some embodiments, an SVM may be provided with a set of training data, which may include some or all entries in the purchase DB 130 and the feedback DB 135 related to the same mfg size of the same product ID, including consumer body measurements and preference information. At operation 630, the computing device may select entries in the purchase DB 130 associated with a desired item and mfg size combination, for example item A having a mfg size of "XL" as shown and described with regard to FIGS. 2-3.

At operation 635, the computing device may classify the selected entries with a corresponding sizing-related entry in the feedback DB 135 as belonging to a first cluster and classify the remaining entries in the purchase DB 130 as belonging to the second cluster. In various embodiments, the first cluster may be a "poor fit" cluster and the second cluster may be a "good fit" cluster as described herein.

At operation 640, the computing device may perform a cluster analysis on the selected entries to generate a model that clusters user data into the first cluster of the second cluster. In various embodiments, the model may be an SVM model. Furthermore, in some embodiments, generating the model may include determining minimum (min) body measurement values and/or maximum (max) body measurement values of users associated with purchase information and excluding users associated with size related reasons for return. Moreover, generating the model may include determining one or more characteristics associated with the item/mfg size combination of users associated with purchase information and excluding users associated with size related reasons for return. Examples of such min and max values and such characteristics, is shown by the sizing information shown by FIG. 3. The aforementioned clusters may be determined using any suitable machine-learning algorithm, such as using a multi-dimensional clustering algorithm, a constraint satisfaction algorithm, a SVM, and the like. At operation 645, the computing device may store the model, which could in various embodiments be the SVM model or the min/max body measurement values and the characteristics, for the item/mfg sizing combination.

At operation 650, the computing device determines whether there are any additional item/mfg sizing combinations remaining in the purchase DB 130. If the computing device determines that there are additional item/mfg sizing combinations remaining in the purchase DB 130, then the computing device may proceed to operation 630 to select entries in the purchase DB 130 associated with a desired item and mfg size combination, for example item A having a mfg size of "L" as shown and described with regard to FIGS. 2-3. If the computing device determines that there are no remaining item/mfg sizing combinations remaining in the purchase DB 130, then the computing device may proceed to operation 630 to operation 655 to end the training.

Referring back to FIG. 6, at operation 615, the computing device may generate a recommendation message for a first user. Operation 615 is described in more detail with regard to FIG. 8.

Referring now to FIG. 8, at operation 657, the computing device may obtain a request message from a computing device associated with the first user via a merchant service 120. In some embodiments, the request message may be generated by the merchant service 120 based on information received by the merchant service 120 from the computing device 110-12, or the request message may be generated by the computing device 110-12 and passed through the merchant service 120. The request message may include a product ID associated with an item, a product serial number, mfg sizing information, first user data associated with the first user 105-1, and/or any other like information associated with an item or the first user 105-1. At operation 660, the computing device may determine first body measurements associated with the first user. At operation 663, the computing device may determine first user characteristics associated with the first user. Such first body measurements and first user characteristics may be determined from first user data included with the request message.

At operation 666, the computing device may determine a product and mfg size of interest. In embodiments, the item/mfg size of interest may be based on the product ID, product serial number, and/or mfg sizing information contained in the request message. At operation 669, the computing device may obtain a model associated with the product/mfg size of interest combination from the sizing DB 140. Such a model may be generated according to the process described with regard to FIG. 7. At operation 672, the computing device may determine a corresponding cluster to which the first body measurements and the first user characteristics should be classified for the item/mfg size of interest. In embodiments where the model is an SVM model, the computing device may try to fit the first body measurements and the first user characteristics into the SVM model. In other embodiments, the computing device may determine, using the obtained model, that the first body measurements and/or the first user characteristics should be classified to the first cluster or the second cluster for the item/mfg size of interest. In some embodiments, such a determination may be based on whether the first body measurements are within the max and min body measurements defined for the second cluster, and if so, classify the first body measurements as being classified as belonging to the second cluster, and otherwise, the computing device may classify the first body measurements as belonging to the first cluster. Further, such a determination may also be based on whether the first user characteristics are substantially similar to the preference information defined for the second cluster, and if so, classify the first user characteristics as being classified as belonging to the second cluster, and otherwise, the computing device may classify the first user characteristics as belonging to the first cluster.

At operation 675, the computing device may determine whether the first body measurements and/or the first user characteristics are classified as belonging to the second cluster (e.g., the "good fit" cluster). If at operation 675, the computing device determines that the first body measurements and/or the first user characteristics are to be classified as belonging to the second cluster, the computing device may proceed to operation 681 to generate a recommendation message recommending the item for purchase. The computing device may then proceed to operation 620 to provide the recommendation message to the first user. If at operation 675, the computing device determines that the first body measurements and/or the first user characteristics are not to be classified as belonging to the second cluster (or should be classified as belonging to the first cluster), the computing device may proceed to operation 678 to generate a recommendation message not recommending the item for purchase. In embodiments, the recommendation message not recommending the item for purchase may include recommendations to purchase one or more other items based on the first user measurements and/or the first user characteristics. The computing device may then proceed to operation 620 to provide the recommendation message to the first user. Referring back to FIG. 6, at operation 620, the computing device may provide the recommendation message to the first user.

Some non-limiting Examples are provided below.

Example 1 may include a computing device for providing online clothing e-commerce, comprising: at least one processor; a sizing information module to operate on the at least one processor to obtain purchase information associated with individual users each of which corresponds to at least one user device of a plurality of user devices, wherein the purchase information is to indicate a purchase of an item by the individual users; obtain feedback information associated with the item wherein the feedback information is to be provided by a subset of the individual users; and generate sizing information for the item based on the purchase information and the feedback information; a recommendation module to operate on the at least one processor to perform machine-learning analysis on the purchase information and feedback information to generate a recommendation message for a first user device based at least in part on results of the machine-learning analysis, and on the sizing information and first user data; and a communication module, communicatively coupled with the at least one processor, to obtain the first user data, and provide the recommendation message to the first user device.

Example 2 may include the computing device of example 1 and/or any one or more examples disclosed herein, wherein the first user data includes at least one of first body measurements associated with a user of the first user device, first demographic information associated with the user, or first preference information of the user.

Example 3 may include the computing device of example 2 and/or any one or more examples disclosed herein, wherein the first user data is to be obtained via an online form of a webpage provided by a merchant service or obtained from data associated with one or more applications stored on a computer-readable medium of the first user device, wherein the at least one or more applications include at least one of a web browser, an application for purchasing items via the merchant service, or an application associated with a third party communication platform; or wherein at least the first body measurements are to be obtained by at least one sensor associated with the first user device.

Example 4 may include the computing device of any of examples 1-3 and/or any one or more examples disclosed herein, wherein the purchase information is to include body measurement information to indicate at least one body measurement for a corresponding one of the individual users or preference information to indicate at least one preference for the corresponding ones of the individual users; and the feedback information is to include the body measurement information of the subset of the individual users, the preference information of the subset of the individual users, and return information of the subset of the individual users, wherein the return information is to indicate a reason why the item was returned to a merchant service, and wherein the sizing information module is to receive the return data from a return database associated with the merchant service.

Example 5 may include the computing device of example 4 and/or any one or more examples disclosed herein, wherein, to generate the sizing information, the sizing information module is to: generate a model for the item to be used to determine whether the first user is to be classified as belonging to a first cluster or a second cluster, wherein the first cluster represents items that were returned and the reason indicated by the return information is representative of a size related return, and the second cluster represents the items purchased that are not in the first cluster, and wherein a clustering operation to generate the first cluster and the second cluster is based on the body measurement information and the preference information of the individual users; and store, in a sizing information database, the model in association with the body measurement information and the preference information.

Example 6 may include the computing device of example 5 and/or any one or more examples disclosed herein, wherein to generate the recommendation message for the first user device, the recommendation module is to: determine, based on the first user data, a product of interest, first body measurements associated with a user of the first user device, and first preference information of the user of the first user device; obtain the model from the sizing information database when the product of interest is substantially similar to the item; determine first user characteristics associated with the user of the first user device based on the first preference information; determine using the model and based on at least one first user characteristic of the first user characteristics and the first body measurements, whether the first user should be classified as belonging to the first cluster or the second cluster; and generate the recommendation message to recommend the item for purchase when the first user is determined to be classified as belonging to the second cluster, or generate the recommendation message to not recommend the item for purchase when the first user is determined to be classified as belonging to the first cluster.

Example 7 may include the computing device of example 6 and/or any one or more examples disclosed herein, wherein the model is based on a minimum body measurement value and a maximum body measurement value from the body measurement information of each of the individual users associated with the purchase information and not within the subset of the individual users associated with the feedback information, and the recommendation module is to use the model to classify the first user data as belonging to the second cluster when the first user data includes a body measurement within the minimum body measurement value and the maximum body measurement value.

Example 8 may include the computing device of example 6 and/or any one or more examples disclosed herein, wherein the model is a support vector machine (SVM) model, and the sizing information module is to use the purchase information and the feedback information as training data.

Example 9 may include the computing device of example 8 and/or any one or more examples disclosed herein, wherein the recommendation message to not recommend the item for purchase includes a recommendation for another item to purchase based on the first user characteristics.

Example 10 may include the computing device of example 1 and/or any one or more examples disclosed herein, wherein the recommendation module is to generate the recommendation in response to receipt of a request message wherein the recommendation module is to receive the query via the communication module.

Example 11 may include the computing device of example 10 and/or any one or more examples disclosed herein, wherein the communication module is to receive the request message from a merchant application associated with a merchant service that is to sell the item, and wherein the request message is based on text entered into the merchant application, or the request message is based on a bar code or a quick response code obtained using at least one sensor of the first user device via the merchant application.

Example 12 may include the computing device of example 11 and/or any one or more examples disclosed herein, wherein the first user data includes position information associated with the first user device, and the recommendation module is generate the recommendation based on a determination as to whether the distance between the item and the first user device is determined to be within a predefined distance.

Example 13 may include at least one computer-readable medium including instructions to cause a computing device, in response to execution of the instructions by the computing device, to: obtain purchase information associated with individual users each of which corresponds to at least one user device of a plurality of user devices, wherein the purchase information is to indicate a purchase of an item by the individual users; obtain feedback information associated with the item wherein the feedback information is to be provided by a subset of the individual users; generate sizing information for the item based on the purchase information and the feedback information; perform machine-learning analysis on the purchase information and feedback information to generate a recommendation message for a first user device based at least in part on results of the machine-learning analysis, and on the sizing information and first user data to be obtained in a request message; and provide the recommendation message to the first user device. The at least one computer readable medium may be a non-transitory computer readable medium.

Example 14 may include the at least one computer-readable medium of example 13 and/or any one or more examples disclosed herein, wherein the first user data includes at least one of first body measurements associated with a user of the first user device, first demographic information associated with the user, or first preference information of the user.

Example 15 may include the at least one computer-readable medium of example 14 and/or any one or more examples disclosed herein, wherein the first user data is to be obtained via an online form of a webpage provided by a merchant service or obtained from data associated with one or more applications stored on a computer-readable medium of the first user device, wherein the at least one or more applications include at least one of a web browser, an application for purchasing items via the merchant service, or an application associated with a third party communication platform; or wherein at least the first body measurements are to be obtained by at least one sensor associated with the first user device.

Example 16 may include the at least one computer-readable medium of any of examples 13-15 and/or any one or more examples disclosed herein, wherein the purchase information is to include body measurement information to indicate at least one body measurement for a corresponding one of the individual users or preference information to indicate at least one preference for the corresponding ones of the individual users; and the feedback information is to include the body measurement information of the subset of the individual users, the preference information of the subset of the individual users, and return information of the subset of the individual users, wherein the return information is to indicate a reason why the item was returned to a merchant service, and wherein the instructions cause the computing device, in response to execution of the instructions by the computing device to receive the return data from a return database associated with the merchant service.

Example 17 may include the at least one computer-readable medium of example 16 and/or any one or more examples disclosed herein, wherein, to generate the sizing information, the instructions cause the computing device, in response to execution of the instructions by the computing device to: generate a model for the item to be used to determine whether the first user is to be classified as belonging to a first cluster or a second cluster, wherein the first cluster represents items that were returned and the reason indicated by the return information is representative of a size related return, and the second cluster represents the items purchased that are not in the first cluster, and wherein a clustering operation to generate the first cluster and the second cluster is based on the body measurement information and the preference information of the individual users; and store, in a sizing information database, the model in association with the body measurement information and the preference information.

Example 18 may include the at least one computer-readable medium of example 17 and/or any one or more examples disclosed herein, wherein to generate the recommendation message for the first user device, the instructions cause the computing device, in response to execution of the instructions by the computing device to: determine, based on the first user data, a product of interest, first body measurements associated with a user of the first user device, and first preference information of the user of the first user device; obtain the model from the sizing information database when the product of interest is substantially similar to the item; determine first user characteristics associated with the user of the first user device based on the first preference information; determine using the model and based on at least one first user characteristic of the first user characteristics and the first body measurements, whether the first user should be classified as belonging to the first cluster or the second cluster; and generate the recommendation message to recommend the item for purchase when the first user is determined to be classified as belonging to the second cluster, or generate the recommendation message to not recommend the item for purchase when the first user is determined to be classified as belonging to the first cluster.

Example 19 may include the at least one computer-readable medium of example 18 and/or any one or more examples disclosed herein, wherein the model is based on a minimum body measurement value and a maximum body measurement value from the body measurement information of each of the individual users associated with the purchase information and not within the subset of the individual users associated with the feedback information, and the instructions cause the computing device, in response to execution of the instructions by the computing device to use the model to classify the first user data as belonging to the second cluster when the first user data includes a body measurement within the minimum body measurement value and the maximum body measurement value.

Example 20 may include the at least one computer-readable medium of example 18 and/or any one or more examples disclosed herein, wherein the model is a support vector machine (SVM) model, and the instructions cause the computing device, in response to execution of the instructions by the computing device to use the purchase information and the feedback information as training data.

Example 21 may include the at least one computer-readable medium of example 20 and/or any one or more examples disclosed herein, wherein the recommendation message to not recommend the item for purchase includes a recommendation for another item to purchase based on the first user characteristics.

Example 22 may include the at least one computer-readable medium of example 13 and/or any one or more examples disclosed herein, wherein the instructions cause the computing device, in response to execution of the instructions by the computing device to generate the recommendation in response to receipt of the request message.

Example 23 may include the at least one computer-readable medium of example 22 and/or any one or more examples disclosed herein, wherein the instructions cause the computing device, in response to execution of the instructions by the computing device to receive the request message from a merchant application associated with a merchant service that is to sell the item, and wherein the request message is based on text entered into the merchant application, or the request message is based on a bar code or a quick response code obtained using at least one sensor of the first user device via the merchant application.

Example 24 may include the at least one computer-readable medium of example 23 and/or any one or more examples disclosed herein, wherein the first user data includes position information associated with the first user device, and the instructions cause the computing device, in response to execution of the instructions by the computing device generate the recommendation based on a determination as to whether the distance between the item and the first user device is determined to be within a predefined distance.

Example 25 may include a computing device for providing online clothing e-commerce, comprising: a sizing information means to obtain purchase information associated with individual users each of which corresponds to at least one user device of a plurality of user devices, wherein the purchase information is to indicate a purchase of an item by the individual users; obtain feedback information associated with the item wherein the feedback information is to be provided by a subset of the individual users; and generate sizing information for the item based on the purchase information and the feedback information; a recommendation means to perform machine-learning analysis on the purchase information and feedback information to generate a recommendation message for a first user device based at least in part on results of the machine-learning analysis, and on the sizing information and first user data; and a communication means to obtain the first user data, and provide the recommendation message to the first user device.

Example 26 may include the computing device of example 25 and/or any one or more examples disclosed herein, wherein the first user data includes at least one of first body measurements associated with a user of the first user device, first demographic information associated with the user, or first preference information of the user.

Example 27 may include the computing device of example 26 and/or any one or more examples disclosed herein, wherein the first user data is to be obtained via an online form of a webpage provided by a merchant service or obtained from data associated with one or more applications stored on a computer-readable medium of the first user device, wherein the at least one or more applications include at least one of a web browser, an application for purchasing items via the merchant service, or an application associated with a third party communication platform; or wherein at least the first body measurements are to be obtained by at least one sensor associated with the first user device.

Example 28 may include the computing device of any of examples 25-27 and/or any one or more examples disclosed herein, wherein the purchase information is to include body measurement information to indicate at least one body measurement for a corresponding one of the individual users or preference information to indicate at least one preference for the corresponding ones of the individual users; and the feedback information is to include the body measurement information of the subset of the individual users, the preference information of the subset of the individual users, and return information of the subset of the individual users, wherein the return information is to indicate a reason why the item was returned to a merchant service, and wherein the sizing information means is to receive the return data from a return database associated with the merchant service.

Example 29 may include the computing device of example 28 and/or any one or more examples disclosed herein, wherein, to generate the sizing information, the sizing information means is to: generate a model for the item to be used to determine whether the first user is to be classified as belonging to a first cluster or a second cluster, wherein the first cluster represents items that were returned and the reason indicated by the return information is representative of a size related return, and the second cluster represents the items purchased that are not in the first cluster, and wherein a clustering operation to generate the first cluster and the second cluster is based on the body measurement information and the preference information of the individual users; and store, in a sizing information database, the model in association with the body measurement information and the preference information.

Example 30 may include the computing device of example 29 and/or any one or more examples disclosed herein, wherein to generate the recommendation message for the first user device, the recommendation means is to: determine, based on the first user data, a product of interest, first body measurements associated with a user of the first user device, and first preference information of the user of the first user device; obtain the model from the sizing information database when the product of interest is substantially similar to the item; determine first user characteristics associated with the user of the first user device based on the first preference information; determine using the model and based on at least one first user characteristic of the first user characteristics and the first body measurements, whether the first user should be classified as belonging to the first cluster or the second cluster; and generate the recommendation message to recommend the item for purchase when the first user is determined to be classified as belonging to the second cluster, or generate the recommendation message to not recommend the item for purchase when the first user is determined to be classified as belonging to the first cluster.

Example 31 may include the computing device of example 30 and/or any one or more examples disclosed herein, wherein the model is based on a minimum body measurement value and a maximum body measurement value from the body measurement information of each of the individual users associated with the purchase information and not within the subset of the individual users associated with the feedback information, and the recommendation means is to use the model to classify the first user data as belonging to the second cluster when the first user data includes a body measurement within the minimum body measurement value and the maximum body measurement value.

Example 32 may include the computing device of example 30 and/or any one or more examples disclosed herein, wherein the model is a support vector machine (SVM) model, and the sizing information means is to use the purchase information and the feedback information as training data.

Example 33 may include the computing device of example 32 and/or any one or more examples disclosed herein, wherein the recommendation message to not recommend the item for purchase includes a recommendation for another item to purchase based on the first user characteristics.

Example 34 may include the computing device of example 25 and/or any one or more examples disclosed herein, wherein the recommendation means is to generate the recommendation in response to receipt of a request message wherein the recommendation means is to receive the query via the communication means.

Example 35 may include the computing device of example 34 and/or any one or more examples disclosed herein, wherein the communication means is to receive the request message from a merchant application associated with a merchant service that is to sell the item, and wherein the request message is based on text entered into the merchant application, or the request message is based on a bar code or a quick response code obtained using at least one sensor of the first user device via the merchant application.

Example 36 may include the computing device of example 35 and/or any one or more examples disclosed herein, wherein the first user data includes position information associated with the first user device, and the recommendation means is generate the recommendation based on a determination as to whether the distance between the item and the first user device is determined to be within a predefined distance.

Example 37 may include a method for providing online clothing e-commerce, the method comprising: obtaining, by a computing device, purchase information associated with individual users each of which corresponds to at least one user device of a plurality of user devices, wherein the purchase information is to indicate a purchase of an item by the individual users; obtaining, by the computing device, feedback information associated with the item wherein the feedback information is to be provided by a subset of the individual users; generate sizing information for the item based on the purchase information and the feedback information; performing, by the computing device, machine-learning analysis on the purchase information and feedback information to generate a recommendation message for a first user device based at least in part on results of the machine-learning analysis, and on the sizing information and first user data; and providing, by the computing device, the recommendation message to the first user device.

Example 38 may include the method of example 37 and/or any one or more examples disclosed herein, wherein the first user data includes at least one of first body measurements associated with a user of the first user device, first demographic information associated with the user, or first preference information of the user.

Example 39 may include the method of example 38 and/or any one or more examples disclosed herein, wherein the first user data is to be obtained via an online form of a webpage provided by a merchant service or obtained from data associated with one or more applications stored on a computer-readable medium of the first user device, wherein the at least one or more applications include at least one of a web browser, an application for purchasing items via the merchant service, or an application associated with a third party communication platform; or wherein at least the first body measurements are to be obtained by at least one sensor associated with the first user device.

Example 40 may include the method of example 37 and/or any one or more examples disclosed herein, wherein the purchase information is to include body measurement information to indicate at least one body measurement for a corresponding one of the individual users or preference information to indicate at least one preference for the corresponding ones of the individual users; and the feedback information is to include the body measurement information of the subset of the individual users, the preference information of the subset of the individual users, and return information of the subset of the individual users, wherein the return information is to indicate a reason why the item was returned to a merchant service, and the method comprises receiving, by the computing device, the return data from a return database associated with the merchant service.

Example 41 may include the method of example 40 and/or any one or more examples disclosed herein, wherein, to generate the sizing information, the instructions cause the computing device, in response to execution of the instructions by the computing device to: generate a model for the item to be used to determine whether the first user is to be classified as belonging to a first cluster or a second cluster, wherein the first cluster represents items that were returned and the reason indicated by the return information is representative of a size related return, and the second cluster represents the items purchased that are not in the first cluster, and wherein a clustering operation to generate the first cluster and the second cluster is based on the body measurement information and the preference information of the individual users; and store, in a sizing information database, the model in association with the body measurement information and the preference information.

Example 42 may include the method of example 41 and/or any one or more examples disclosed herein, wherein to generate the recommendation message for the first user device, the instructions cause the computing device, in response to execution of the instructions by the computing device to: determine, based on the first user data, a product of interest, first body measurements associated with a user of the first user device, and first preference information of the user of the first user device; obtain the model from the sizing information database when the product of interest is substantially similar to the item; determine first user characteristics associated with the user of the first user device based on the first preference information; determine using the model and based on at least one first user characteristic of the first user characteristics and the first body measurements, whether the first user should be classified as belonging to the first cluster or the second cluster; and generate the recommendation message to recommend the item for purchase when the first user is determined to be classified as belonging to the second cluster, or generate the recommendation message to not recommend the item for purchase when the first user is determined to be classified as belonging to the first cluster.

Example 43 may include the method of example 42 and/or any one or more examples disclosed herein, wherein the model is based on a minimum body measurement value and a maximum body measurement value from the body measurement information of each of the individual users associated with the purchase information and not within the subset of the individual users associated with the feedback information, and the instructions cause the computing device, in response to execution of the instructions by the computing device to use the model to classify the first user data as belonging to the second cluster when the first user data includes a body measurement within the minimum body measurement value and the maximum body measurement value.

Example 44 may include the method of example 42 and/or any one or more examples disclosed herein, wherein the model is a support vector machine (SVM) model, and the instructions cause the computing device, in response to execution of the instructions by the computing device to use the purchase information and the feedback information as training data.

Example 45 may include the method of example 44 and/or any one or more examples disclosed herein, wherein the recommendation message to not recommend the item for purchase includes a recommendation for another item to purchase based on the first user characteristics.

Example 46 may include the method of example 37 and/or any one or more examples disclosed herein, wherein the instructions cause the computing device, in response to execution of the instructions by the computing device to generate the recommendation in response to receipt of a request message wherein the method comprises receiving the request message from a merchant service.

Example 47 may include the method of example 46 and/or any one or more examples disclosed herein, wherein the instructions cause the computing device, in response to execution of the instructions by the computing device to receive the request message from a merchant application associated with a merchant service that is to sell the item, and wherein the request message is based on text entered into the merchant application, or the request message is based on a bar code or a quick response code obtained using at least one sensor of the first user device via the merchant application.

Example 48 may include the method of example 47 and/or any one or more examples disclosed herein, wherein the first user data includes position information associated with the first user device, and the instructions cause the computing device, in response to execution of the instructions by the computing device generate the recommendation based on a determination as to whether the distance between the item and the first user device is determined to be within a predefined distance.

Example 49 may include at least one computer-readable medium including instructions to cause a computing device, in response to execution of the instructions by the computing device, to perform the method of examples 37-48 and/or any one or more examples disclosed herein. The at least one computer-readable medium may include a non-transitory computer-readable medium.

Example 50 may include a system for providing online clothing e-commerce, the system comprising: a first user device associated with a first user; a merchant service; and an apparatus to be implemented in a recommendation service, the apparatus comprising: at least one processor; a sizing information module to operate on the at least one processor to obtain purchase information associated with individual users each of which corresponds to at least one user device of a plurality of user devices, wherein the purchase information is to indicate a purchase of an item by the individual users; obtain feedback information associated with the item wherein the feedback information is to be provided by a subset of the individual users; and generate sizing information for the item based on the purchase information and the feedback information; a recommendation module to operate on the at least one processor to perform machine-learning analysis on the purchase information and feedback information to generate a recommendation message for the first user device based at least in part on results of the machine-learning analysis, and on the sizing information and first user data contained in a request message; and a communication module, communicatively coupled with the at least one processor, to obtain the request message from the merchant service, and provide the recommendation message to the first user device, wherein one of the merchant service or the first user device is to generate the request message.

Example 51 may include the system of example 50 and/or any one or more examples disclosed herein, wherein the first user data includes at least one of first body measurements associated with a user of the first user device, first demographic information associated with the user, or first preference information of the user.

Example 52 may include the system of example 51 and/or any one or more examples disclosed herein, wherein the first user data is to be obtained via an online form of a webpage provided by a merchant service or obtained from data associated with one or more applications stored on a computer-readable medium of the first user device, wherein the at least one or more applications include at least one of a web browser, an application for purchasing items via the merchant service, or an application associated with a third party communication platform; or wherein at least the first body measurements are to be obtained by at least one sensor associated with the first user device.

Example 53 may include the system of any of examples 50-52 and/or any one or more examples disclosed herein, wherein the purchase information is to include body measurement information to indicate at least one body measurement for a corresponding one of the individual users or preference information to indicate at least one preference for the corresponding ones of the individual users; and the feedback information is to include the body measurement information of the subset of the individual users, the preference information of the subset of the individual users, and return information of the subset of the individual users, wherein the return information is to indicate a reason why the item was returned to a merchant service, and wherein the sizing information module is to receive the return data from a return database associated with the merchant service.

Example 54 may include the system of example 53 and/or any one or more examples disclosed herein, wherein, to generate the sizing information, the sizing information module is to: generate a model for the item to be used to determine whether the first user is to be classified as belonging to a first cluster or a second cluster, wherein the first cluster represents items that were returned and the reason indicated by the return information is representative of a size related return, and the second cluster represents the items purchased that are not in the first cluster, and wherein a clustering operation to generate the first cluster and the second cluster is based on the body measurement information and the preference information of the individual users; and store, in a sizing information database, the model in association with the body measurement information and the preference information.

Example 55 may include the system of example 54 and/or any one or more examples disclosed herein, wherein to generate the recommendation message for the first user device, the recommendation module is to: determine, based on the first user data, a product of interest, first body measurements associated with a user of the first user device, and first preference information of the user of the first user device; obtain the model from the sizing information database when the product of interest is substantially similar to the item; determine first user characteristics associated with the user of the first user device based on the first preference information; determine using the model and based on at least one first user characteristic of the first user characteristics and the first body measurements, whether the first user should be classified as belonging to the first cluster or the second cluster; and generate the recommendation message to recommend the item for purchase when the first user is determined to be classified as belonging to the second cluster, or generate the recommendation message to not recommend the item for purchase when the first user is determined to be classified as belonging to the first cluster.

Example 56 may include the system of example 55 and/or any one or more examples disclosed herein, wherein the model is based on a minimum body measurement value and a maximum body measurement value from the body measurement information of each of the individual users associated with the purchase information and not within the subset of the individual users associated with the feedback information, and the recommendation module is to use the model to classify the first user data as belonging to the second cluster when the first user data includes a body measurement within the minimum body measurement value and the maximum body measurement value.

Example 57 may include the system of example 55 and/or any one or more examples disclosed herein, wherein the model is a support vector machine (SVM) model, and the sizing information module is to use the purchase information and the feedback information as training data.

Example 58 may include the system of example 57 and/or any one or more examples disclosed herein, wherein the recommendation message to not recommend the item for purchase includes a recommendation for another item to purchase based on the first user characteristics.

Example 59 may include the system of example 50 and/or any one or more examples disclosed herein, wherein the recommendation module is to generate the recommendation in response to receipt of a request message wherein the recommendation module is to receive the query via the communication module.

Example 60 may include the system of example 59 and/or any one or more examples disclosed herein, wherein the communication module is to receive the request message from a merchant application associated with a merchant service that is to sell the item, and wherein the request message is based on text entered into the merchant application, or the request message is based on a bar code or a quick response code obtained using at least one sensor of the first user device via the merchant application.

Example 61 may include the system of example 60 and/or any one or more examples disclosed herein, wherein the first user data includes position information associated with the first user device, and the recommendation module is generate the recommendation based on a determination as to whether the distance between the item and the first user device is determined to be within a predefined distance.

Example 62 may include the system of example 50 and/or any one or more examples disclosed herein, wherein the merchant service and the computing device are incorporated into a same device or the merchant service and the apparatus are implemented in separate devices.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed:

1. A computing system for providing online clothing recommendation service, the computing system comprising:
   processor circuitry arranged to operate a sizing information module to:
   identify purchase information entries in a purchase information database (DB) associated with an item and feedback information entries in a feedback information DB associated with the item,
   wherein the purchase information is associated with individual users that have purchased the item and each of the individual users corresponds to at least one user device of a plurality of user devices, and the feedback information is information that is indicative of user interactions with the item provided by a subset of the individual users via respective user devices,
   classify, as belonging to a first cluster, feedback information entries of the identified feedback information entries determined to be related to one or more characteristics of the item determined from the feedback information entries,
   classify, as belonging to a second cluster, feedback information entries of the identified feedback information entries determined to not be related to the one or more characteristics,
   generate a machine learning (ML) model that clusters user information of the individual users as belonging to one of the first cluster or the second cluster, and
   store, as sizing information in a sizing DB, the ML model in association with body measurement data indicated by the purchase information entries and preference information associated with the item as indicated by the feedback information entries; and
   the processor circuitry is arranged to operate a recommendation module to:
   input first user data of a first user into the ML model to determine whether the first user should be classified as belonging to the first cluster or the second cluster, and
   generate a recommendation message for a first user device associated with the first user based on a cluster to which the first user is classified according to the ML model; and
   communication circuitry, communicatively coupled with the processor circuitry, the communication circuitry arranged to obtain the first user data, and provide the recommendation message to the first user device.

2. The computing system of claim 1, wherein the first user data includes at least one of first body measurements associated with the first user, first demographic information associated with the first user, or first preference information of the first user.

3. The computing system of claim 2, wherein the first user data is to be obtained via an online form of a webpage provided by a merchant service or obtained from data associated with one or more applications stored on a computer-readable medium of the first user device associated with the first user, wherein the one or more applications include at least one of a web browser, an application for purchasing items via the merchant service, or an application associated with a third party communication platform; or wherein at least the first body measurements are to be obtained by at least one sensor associated with the first user device.

4. The computing system of claim 1, wherein
   purchase information in the purchase information entries includes body measurement information to indicate at least one body measurement for a corresponding one of the individual users or preference information to indicate at least one preference for the corresponding ones of the individual users; and
   feedback information in the feedback information entries includes the body measurement information of the subset of the individual users, the preference information of the subset of the individual users, and return information of the subset of the individual users, wherein the return information is to indicate a reason why the item was returned to a merchant service, and wherein the sizing information module is to receive the return information from a return DB associated with the merchant service.

5. The computing system of claim 4, wherein the first cluster at least represents characteristics of items that were returned and the reason indicated by the return information is representative of a size related return, and the second cluster at least represents characteristics of the items purchased that are not in the first cluster, and wherein a clustering operation to generate the first cluster and the second cluster is based on the body measurement information and the preference information of the individual users, and wherein, to generate the sizing information, the sizing information module is to:
   store, in the sizing DB, the model in association with the body measurement information and the preference information.

6. The computing system of claim 5, wherein to generate the recommendation message for the first user, the recommendation module is arranged to:
   determine, based on the first user data, a product of interest, first body measurements associated with the first user, and first preference information of the first user;
   obtain the model from the sizing DB when the product of interest is determined to have one or more characteristics in common with the one or more characteristics of the item;

determine first user characteristics associated with the user of the first user device based on the first preference information;

determine, using the ML model and based on at least one first user characteristic of the first user characteristics and the first body measurements, whether the first user characteristics should be classified as belonging to the first cluster or the second cluster; and generate the recommendation message to recommend the item for purchase when the first user characteristics are determined to be classified as belonging to the second cluster, or generate the recommendation message to not recommend the item for purchase when the first user characteristics are is-determined to be classified as belonging to the first cluster.

7. The computing system of claim 6, wherein the ML model is based on a minimum body measurement value and a maximum body measurement value from the body measurement information of individual users associated with the purchase information and not among the subset of the individual users associated with the feedback information entries, and the recommendation module is arranged to use the ML model to classify the first user data as belonging to the second cluster when the first user data includes a body measurement within the minimum body measurement value and the maximum body measurement value.

8. The computing system of claim 6, wherein the ML model is a support vector machine (SVM) model, and the sizing information module is arranged to use the purchase information entries and the feedback information entries as training data to generate the ML model.

9. The computing system of claim 8, wherein the recommendation message to not recommend the item for purchase includes a recommendation for another item to purchase based on the first user characteristics.

10. The computing system of claim 1, wherein the communication circuitry is arranged to receive a request message, and the recommendation module is arranged to generate the recommendation in response to receipt of the request message.

11. The computing system of claim 10, wherein the communication circuitry is arranged to receive the request message from a merchant application associated with a merchant service that is to sell the item, and wherein the request message is based on text entered into the merchant application, or the request message is based on a bar code or a quick response code obtained using at least one sensor of the first user device via the merchant application.

12. The computing system of claim 11, wherein the first user data includes position information associated with the first user device, and the recommendation module is arranged to generate the recommendation based on a determination as to whether the distance between the item and the first user device is determined to be within a predefined distance.

13. At least one non-transitory computer-readable medium (NTCRM) that comprises instructions, wherein execution of the instructions by a computing device is to cause the computing device to:

obtain purchase information associated with individual users each of which corresponds to at least one user device of a plurality of user devices, wherein the purchase information is to indicate a purchase of an item by the individual users;

obtain feedback information associated with the item wherein the feedback information is to be provided by a subset of the individual users;

classify, as belonging to a first cluster, feedback information determined to be related to one or more characteristics of the item as determined from the feedback information;

classify, as belonging to a second cluster, feedback information determined to not be related to the one or more characteristics;

generate a machine learning (ML) model that clusters user information of the individual users as belonging to one of the first cluster or the second cluster;

store, as sizing information in a sizing database (DB), the ML model in association with body measurement data indicated by purchase information entries and preference information associated with the item as indicated by feedback information entries;

generate sizing information for the item based on the purchase information and the feedback information;

obtain first user data of a first user;

determine, based on the first user data and the ML model, whether the first user should be classified as belonging to the first cluster or the second cluster;

generate a recommendation message for the first user based on whether the user is to be classified as belonging to the first cluster or the second cluster according to the ML model; and provide the recommendation message to a first user device.

14. The at least one NTCRM of claim 13, wherein the first user data includes at least one of first body measurements associated with a user of the first user device, first demographic information associated with the user, or first preference information of the user.

15. The at least one NTCRM of claim 14, wherein the first user data is to be obtained via an online form of a webpage provided by a merchant service or obtained from data associated with one or more applications stored on a computer-readable medium of the first user device, wherein the one or more applications include at least one of a web browser, an application for purchasing items via the merchant service, or an application associated with a third party communication platform; or wherein at least the first body measurements are to be obtained by at least one sensor associated with the first user device.

16. The at least one NTCRM of claim 13, wherein:

the purchase information is to include body measurement information to indicate at least one body measurement for a corresponding one of the individual users or preference information to indicate at least one preference for the corresponding ones of the individual users; and the feedback information is to include the body measurement information of the subset of the individual users, the preference information of the subset of the individual users, and return information of the subset of the individual users, wherein the return information is to indicate a reason why the item was returned to a merchant service, and wherein execution of the instructions is to cause the computing device to receive the return information from a return DB associated with the merchant service.

17. The at least one NTCRM of claim 16, wherein the first cluster represents items that were returned and the reason indicated by the return information is representative of a size related return, and the second cluster represents the items purchased that are not in the first cluster, and wherein a clustering operation to generate the first cluster and the second cluster is based on the body measurement information and the preference information of the individual users, and wherein, to generate the sizing information, execution of the instructions is to cause the computing device to:

store, in the sizing DB, the model in association with the body measurement information and the preference information.

18. The at least one NTCRM of claim 17, wherein, to generate the recommendation message for the first user device, execution of the instructions is to cause the computing device to:

determine, based on the first user data, a product of interest, first body measurements associated with a user of the first user device, and first preference information of the user of the first user device;

obtain the model from the sizing information DB when the product of interest is determined to have one or more characteristics in common with the one or more characteristics of the item;

determine first user characteristics associated with the user of the first user device based on the first preference information;

determine using the model and based on at least one first user characteristic of the first user characteristics and the first body measurements, whether the first user characteristics should be classified as belonging to the first cluster or the second cluster; and generate the recommendation message to recommend the item for purchase when the first user characteristics are determined to be classified as belonging to the second cluster, or generate the recommendation message to not recommend the item for purchase when the first user characteristics are determined to be classified as belonging to the first cluster.

19. The at least one NTCRM of claim 18, wherein the ML model is based on a minimum body measurement value and a maximum body measurement value from the body measurement information of individual users associated with the purchase information and not within the subset of the individual users associated with the feedback information, and the execution of instructions is to cause the computing device to:

use the ML model to classify the first user data as belonging to the second cluster when the first user data includes a body measurement within the minimum body measurement value and the maximum body measurement value.

20. The at least one NTCRM of claim 18, wherein the ML model is a support vector machine (SVM) model, and execution of the instructions is to cause the computing device to:

use the purchase information and the feedback information as training data.

21. The at least one NTCRM of claim 20, wherein the recommendation message to not recommend the item for purchase includes a recommendation for another item to purchase based on the first user characteristics.

22. The at least one NTCRM of claim 13, wherein execution of the instructions is to cause the computing device to:

generate the recommendation in response to receipt of a request message.

23. The at least one NTCRM of claim 22, wherein execution of the instructions is to cause the computing device to:

receive the request message from a merchant application associated with a merchant service that is to sell the item, and wherein the request message is based on text entered into the merchant application, or the request message is based on a bar code or a quick response code obtained using at least one sensor of the first user device via the merchant application.

24. The at least one NTCRM of claim 23, wherein the first user data includes position information associated with the first user device, and execution of the instructions is to cause the computing device to:

generate the recommendation based on a determination as to whether the distance between the item and the first user device is determined to be within a predefined distance.

* * * * *

UNITED STATES PATENT AND TRADEMARK OFFICE
CERTIFICATE OF CORRECTION

PATENT NO. : 10,497,043 B2  
APPLICATION NO. : 14/864560  
DATED : December 3, 2019  
INVENTOR(S) : Mark D. Yarvis et al.

Page 1 of 1

It is certified that error appears in the above-identified patent and that said Letters Patent is hereby corrected as shown below:

In the Claims

Column 37  
Line 15, "are is-determined…" should read – "are determined…"

Signed and Sealed this  
Eleventh Day of February, 2020

Andrei Iancu  
*Director of the United States Patent and Trademark Office*